US012587739B2

(12) United States Patent
Chen et al.

(10) Patent No.: US 12,587,739 B2
(45) Date of Patent: Mar. 24, 2026

(54) CONTROL METHOD AND APPARATUS

(71) Applicant: Shenzhen Yinwang Intelligent Technologies Co., Ltd., Shenzhen (CN)

(72) Inventors: Zhikai Chen, Shanghai (CN); Xubiao Gong, Shanghai (CN); Huazhou Yu, Shanghai (CN); Jinghuan Yang, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/446,719

(22) Filed: Aug. 9, 2023

(65) Prior Publication Data

US 2023/0388629 A1     Nov. 30, 2023

Related U.S. Application Data

(63) Continuation of application No. PCT/CN2021/131309, filed on Nov. 17, 2021.

(30) Foreign Application Priority Data

Feb. 10, 2021     (CN) ......................... 202110185632.X

(51) Int. Cl.
*H04N 23/667*          (2023.01)
*B60R 11/04*          (2006.01)
(Continued)

(52) U.S. Cl.
CPC ........... *H04N 23/667* (2023.01); *B60R 11/04* (2013.01); *H04N 23/695* (2023.01); (Continued)

(58) Field of Classification Search
None
See application file for complete search history.

(56) References Cited

U.S. PATENT DOCUMENTS

| | | | |
|---|---|---|---|
| 2007/0198128 A1 | 8/2007 | Ziegler et al. | |
| 2011/0074916 A1* | 3/2011 | Demirdjian ............ | H04N 7/181 |
| | | | 348/E13.001 |

(Continued)

FOREIGN PATENT DOCUMENTS

| | | |
|---|---|---|
| CN | 204681481 U | 9/2015 |
| CN | 106982345 A | 7/2017 |

(Continued)

*Primary Examiner* — Samuel D Fereja
(74) *Attorney, Agent, or Firm* — Leydig, Voit & Mayer, Ltd.

(57) ABSTRACT

A control method and apparatus are provided. The method is used to control an image shooting apparatus. The image shooting apparatus includes one camera or at least two cameras. The method includes: obtaining an instruction and/or cockpit information; generating control signaling according to the instruction and/or the obtained cockpit information; and when the image shooting apparatus includes one camera, controlling a space state of the camera of the image shooting apparatus by using the control signaling, or when the image shooting apparatus includes at least two cameras, controlling space states of some or all of the cameras by using the control signaling, so that at least one camera of the image shooting apparatus is flexibly controlled, and flexible changes of the space states of the cameras can meet requirements of a user for different multimedia scenarios. This improves user experience.

20 Claims, 23 Drawing Sheets

(51) Int. Cl.
  H04N 23/695 (2023.01)
  H04N 23/698 (2023.01)

(52) U.S. Cl.
  CPC ........ H04N 23/698 (2023.01); B60R 2300/30
      (2013.01); B60R 2300/8006 (2013.01)

(56) References Cited

U.S. PATENT DOCUMENTS

| | | | | |
|---|---|---|---|---|
| 2019/0177004 | A1* | 6/2019 | Skelly ................ | B64D 45/0059 |
| 2020/0304553 | A1* | 9/2020 | Luo ......................... | H04L 65/65 |
| 2022/0229432 | A1* | 7/2022 | Van Wiemeersch ..... | B62D 1/00 |

FOREIGN PATENT DOCUMENTS

| | | | |
|---|---|---|---|
| CN | 110876032 A | 3/2020 |
| CN | 111724793 A | 9/2020 |
| CN | 111756986 A | 10/2020 |

* cited by examiner

Vehicle 100

Panoramic photographing mode in a cockpit

Panoramic photographing mode outside a vehicle

Take images or record videos for a driver (A)                    (B)                    (C)

Take images or record videos for a front passenger

Dual-camera video mode: front passenger mode

CONTROL METHOD AND APPARATUS

CROSS-REFERENCE TO RELATED APPLICATIONS

This application is a continuation of International Application No. PCT/CN2021/131309, filed on Nov. 17, 2021, which claims priority to Chinese Patent Application No. 202110185632.X, filed on Feb. 10, 2021. The disclosures of the aforementioned applications are hereby incorporated by reference in their entireties.

TECHNICAL FIELD

This application relates to the field of intelligent vehicle technologies, and in particular, to a control method and apparatus.

BACKGROUND

With electronization and intelligentization of automobiles, the automobiles not only are used as vehicles to provide travel convenience for users, but also can provide the users with more experience, for example, multimedia experience. However, current multimedia experience of the automobiles is far from enough to meet flexible needs of the users.

SUMMARY

This application provides a control method and apparatus, to improve a flexible requirement of a user for vehicle experience.

According to a first aspect, an embodiment of this application provides a control method, where the method is used to control an image shooting apparatus, and the image shooting apparatus includes one camera or at least two cameras. The method includes: obtaining an instruction and/or cockpit information; generating control signaling according to the instruction and/or the obtained cockpit information; and when the image shooting apparatus includes one camera, controlling a space state of the camera of the image shooting apparatus by using the control signaling, or when the image shooting apparatus includes at least two cameras, controlling space states of some or all of the cameras by using the control signaling.

Based on this solution, the control apparatus generates the control signaling according to the obtained instruction and/or the cockpit information, and controls, by using the control signaling, the space state of the camera included in the image shooting apparatus, so that at least one camera of the image shooting apparatus is flexibly controlled, a flexible change of a space state of the camera can meet a requirement of a user for different multimedia scenarios, and user experience is improved.

In an implementation, the space state includes an angle, a position, or an angle and a position. The angle may be a rotation angle or a pitch angle (or a vertical field of view), and the position may be a position when the camera is in a pop-up state or a position when the camera is in a retracted state. In this way, the control apparatus may implement rotation control and/or pop-up control on the camera included in the image shooting apparatus.

In an implementation, the instruction includes any one of the following: a voice instruction, an instruction obtained by processing the voice instruction, an instruction input on a user interface, an instruction obtained by processing the instruction input on the user interface, and a received signal.

In an implementation, the instruction indicates a mode, and the mode includes: a panoramic photographing mode in a cockpit, a panoramic photographing mode outside a vehicle, a driver photographing mode, a front passenger photographing mode, a privacy mode, a video call mode, or a dual-camera video mode.

In an implementation, the cockpit information includes sound information in the cockpit, image information in the cockpit, a seat state in the cockpit, and a running state of a vehicle in which the cockpit is located.

In an implementation, the mode indicated by the instruction is the panoramic photographing mode in the cockpit, and the control signaling is used to control a first camera of the image shooting apparatus to: rotate within a first preset angle range and perform panoramic scanning on space inside the cockpit. Based on a rotation feature of the first camera in this implementation, a requirement of a driver or a passenger for panoramic photographing inside the cockpit can be met.

In an implementation, the mode indicated by the instruction is the panoramic photographing mode outside the vehicle, and the control signaling is used to control a first camera of the image shooting apparatus to: rotate within a second preset angle range and perform panoramic scanning on space outside the vehicle. Based on a rotation feature of the first camera in this implementation, a requirement of a driver or a passenger for panoramic photographing outside the vehicle can be met.

In an implementation, the mode indicated by the instruction is the driver photographing mode, and the control signaling is used to control a first camera of the image shooting apparatus to: rotate to face a driver position of a vehicle and perform a photographing action on the driver position. Based on a rotation feature of the first camera in this implementation, a photographing requirement of the driver position can be met, and a driver photograph at an optimal angle can be photographed.

In an implementation, the mode indicated by the instruction is the front passenger photographing mode, and the control signaling is used to control a first camera of the image shooting apparatus to: rotate to face a front passenger position of a vehicle and perform a photographing action on the front passenger position. Based on a rotation feature of the first camera in this implementation, a photographing requirement of the front passenger position can be met, and a passenger image of the front passenger position at an optimal angle can be photographed.

In an implementation, the mode indicated by the instruction is the video call mode, and the generating control signaling according to the instruction and the obtained cockpit information includes: determining a position of a video call object based on the video call mode indicated by the instruction, a seat state in the cockpit, sound information in the cockpit, and image information in the cockpit; and generating the control signaling based on the position of the video call object, where the control signaling is used to control a first camera to rotate to face the position of the video call object. Based on a rotation feature of the first camera in this implementation, the position of the video call object can be automatically identified, to meet a video call requirement of a driver or a passenger.

In an implementation, the mode indicated by the instruction is the dual-camera video mode, and the generating control signaling according to the instruction and/or the obtained cockpit information may include: determining a type of the dual-camera video mode based on the dual-camera video mode indicated by the instruction and a running state of a vehicle in which the cockpit is located; and generating the control instruction based on the type of the dual-camera video mode.

The type of the dual-camera video mode is a driver mode, and the control signaling is used to control a first camera of the image shooting apparatus to: rotate to a first field of view to face a driver position and perform video capture on the driver position, and is used to control a second camera of the image shooting apparatus to: rotate to face space outside the vehicle and perform video capture on the space outside the vehicle, or control a second camera of the image shooting apparatus to: rotate to a second field of view to face the driver position and perform video capture on the driver position; or the type of the dual-camera video mode is a front passenger mode, and the control signaling is used to control a first camera of the image shooting apparatus to: rotate to a first field of view to face a front passenger position and perform video capture on the front passenger position, and is used to: control a second camera of the image shooting apparatus to: rotate to face space outside the vehicle and perform video capture on the space outside the vehicle, or control a second camera of the image shooting apparatus to: rotate to a second field of view to face the front passenger position and perform video capture on the front passenger position; or the type of the dual-camera video mode is a two-person mode, and the control signaling is used to control a first camera of the image shooting apparatus to: rotate to face a driver position and perform video capture on the driver position, and control a second camera of the image shooting apparatus to: rotate to face a front passenger position and perform video capture on the front passenger position.

According to this implementation, when the driver mode or the front passenger mode is enabled, one camera faces the inside of the vehicle, and the other camera faces the outside of the vehicle. This can meet a requirement of synchronous photographing of front and rear dual scenarios, and provide an optimal video angle. Alternatively, when two cameras face different fields of view of a same object, the video object may be displayed from a plurality of angles. When the two-person mode is enabled, photographing requirement requirements of a driver and a front passenger can be met and the optimal video angle of the driver and the front passenger can be provided.

In an implementation, the mode indicated by the instruction is the privacy mode, and the control signaling is used to control the image shooting apparatus to retract all cameras included in the image shooting apparatus. A pop-up camera may pop up when a user needs to use the camera, and can be lowered and retracted when the user does not need to use the camera. In this way, user privacy can be completely protected when the camera is retracted.

In an implementation, the image shooting apparatus further includes a third camera, and the third camera remains in a pop-up state after the vehicle is started, and performs video capture on the space outside the vehicle. This allows continuous monitoring of the outside of the vehicle.

According to a second aspect, an embodiment of this application provides a control method, where the method is used to control an image shooting apparatus, and the image shooting apparatus includes one camera or at least two cameras. The method includes: obtaining, by the control apparatus, an instruction, where the instruction indicates a mode; and generating first control signaling based on the mode, where the first control signaling is used to control a space state of at least one camera of the image shooting apparatus, and sending the first control signaling to the image shooting apparatus.

Based on this solution, the control apparatus generates the first control signaling according to the obtained instruction, and controls, by using the first control signaling, the space state of the camera included in the image shooting apparatus, so that the at least one camera of the image shooting apparatus is flexibly controlled, a flexible change of a space state of the camera can meet a requirement of a user for different multimedia scenarios, and user experience is improved.

In an implementation, the mode includes one or more of the following modes: a panoramic photographing mode in a cockpit, a panoramic photographing mode outside a vehicle, a driver photographing mode, a front passenger photographing mode, a privacy mode, a video call mode, or a dual-camera video mode.

In an implementation, the image shooting apparatus includes a first camera, the mode is the panoramic photographing mode in the cockpit, and the first control signaling is used to control the first camera to rotate to a first preset angle. After the sending, by the control apparatus, the first control signaling to the image shooting apparatus, the method may further include: receiving, by the control apparatus, a first state feedback from the image shooting apparatus, and then sending second control signaling to the image shooting apparatus, where the first state feedback indicates the first camera to complete execution of the first control signaling, and the second control signaling is used to control the first camera to rotate within a first preset angle range starting from the first preset angle, and to capture a panoramic image in the cockpit in a rotation process. Based on a rotation feature of the first camera in this implementation, the first camera is controlled, through two pieces of control signaling, to rotate to capture the panoramic image. This can meet a requirement of a driver or a passenger for panoramic photographing inside the cockpit.

In an implementation, the image shooting apparatus includes a first camera, and the mode is the panoramic photographing mode in the cockpit. The first control signaling is used to control the first camera to rotate to a first preset angle, and to rotate within a first preset angle range starting from the first preset angle after preset duration, and to capture the panoramic image in the cockpit in a rotation process. Based on a rotation feature of the first camera in this implementation, the first camera is controlled, through one piece of control signaling, to rotate to capture the panoramic image. This can meet a requirement of a driver or a passenger for panoramic photographing inside the cockpit.

In an implementation, the method further includes: receiving first image data from the image shooting apparatus, processing the first image data to obtain a panoramic image in the vehicle cockpit, and controlling a display to display the panoramic image in the vehicle cockpit.

In an implementation, the image shooting apparatus includes a first camera and a second camera, and the mode is the panoramic photographing mode in the cockpit. The first control signaling is used to control the first camera to rotate to a second preset angle and control the second camera to rotate to a third preset angle. After the sending the first control signaling to the image shooting apparatus, the method further includes: receiving a first state feedback from the image shooting apparatus, where the first state feedback indicates a camera included in the image shooting apparatus to complete execution of the first control signaling; and sending third control signaling to the image shooting apparatus, where the third control signaling is used to: control the first camera to rotate within a second preset angle range starting from the second preset angle, and to capture a panoramic image in the cockpit in a rotation process, and control the second camera to rotate within a third preset angle range starting from the third preset angle, and to capture the panoramic image in the cockpit during the rotation. Based on rotation features of the first camera and the second camera in this implementation, the two cameras are controlled, through two pieces of control signaling, to rotate to capture the panoramic image. This can meet a requirement of a driver or a passenger for panoramic photographing inside the cockpit.

In an implementation, the image shooting apparatus includes a first camera and a second camera, and the mode is the panoramic photographing mode in the cockpit. The first control signaling is used to: control the first camera to rotate to a second preset angle, and to rotate within a second preset angle range starting from the second preset angle after preset duration and capture the panoramic image in the cockpit, and control the second camera to rotate to a third preset angle, and to rotate within a third preset angle range starting from the third preset angle after the preset duration and capture the panoramic image in the cockpit. Based on rotation features of the first camera and the second camera in this implementation, the two cameras are controlled, through one piece of control signaling, to rotate to capture the panoramic image. This can meet a requirement of a driver or a passenger for panoramic photographing inside the cockpit.

In an implementation, the method further includes: receiving, by the control apparatus, second image data and third image data from the image shooting apparatus, where the second image data is obtained by capturing, by the first camera, an image in the vehicle cockpit, and the third image data is obtained by capturing, by the second camera, an image in the vehicle cockpit; performing splicing processing on the second image data and the third image data to obtain the panoramic image in the vehicle cockpit; and controlling a display to display the panoramic image in the vehicle cockpit.

In an implementation, the image shooting apparatus includes a first camera, and the mode is the panoramic photographing mode outside the vehicle. The first control signaling is used to control the first camera to rotate to a fourth preset angle. After the sending the first control signaling to the image shooting apparatus, the method further includes: receiving a second state feedback from the image shooting apparatus, where the second state feedback indicates the first camera to complete execution of the first control signaling, sending fourth control signaling to the image shooting apparatus, where the fourth control signaling is used to control the first camera to rotate within a fourth preset angle range starting from the fourth preset angle and capture the panoramic image outside the vehicle. Based on a rotation feature of the first camera in this implementation, the first camera is controlled, through two pieces of control signaling, to rotate to capture the panoramic image outside the vehicle, so that a requirement of a driver or a passenger for panoramic photographing outside the vehicle can be met.

In an implementation, the image shooting apparatus includes a first camera, and the mode is the panoramic photographing mode outside the vehicle. The first control signaling is used to control the first camera to rotate to a fourth preset angle, and to rotate within a fourth preset angle range starting from the fourth preset angle after preset duration and capture the image. Based on a rotation feature of the first camera in this implementation, the first camera is controlled, through one piece of control signaling, to rotate to capture the panoramic image outside the vehicle. This can meet a requirement of a driver or a passenger for panoramic photographing outside the vehicle.

In an implementation, the method further includes: receiving, by the control apparatus, fourth image data from the image shooting apparatus; processing the fourth image data to obtain a panoramic image outside the vehicle; and controlling a display to display the panoramic image outside the vehicle.

In an implementation, the image shooting apparatus includes a first camera and a second camera, and the mode is the panoramic photographing mode outside the vehicle. The first control signaling is used to control the first camera to rotate to a fifth preset angle and control the second camera to rotate to a sixth preset angle. After the sending, by the control apparatus, the first control signaling to the image shooting apparatus, the method further includes: receiving, by the control apparatus, a first state feedback from the image shooting apparatus, and then sending fifth control signaling to the image shooting apparatus, where the first state feedback indicates a camera included in the image shooting apparatus to complete execution of the first control signaling, and the fifth control signaling is used to: control the first camera to rotate within a fifth preset angle range starting from the fifth preset angle and capture the image, and control the second camera to rotate within a sixth preset angle range starting from the sixth preset angle and capture the image. Based on rotation features of the first camera and the second camera in this implementation, the two cameras are controlled, through two pieces of control signaling, to rotate to capture the panoramic image outside the vehicle. This can meet a requirement of a driver or a passenger for panoramic photographing outside the vehicle.

In an implementation, the image shooting apparatus includes a first camera and a second camera, and the mode is the panoramic photographing mode outside the vehicle. The first control signaling is used to: control the first camera to rotate to a fifth preset angle, and to rotate within a fifth preset angle range starting from the fifth preset angle after preset duration and capture the image, and control the second camera to rotate to a sixth preset angle, and to rotate within a sixth preset angle range starting from the sixth preset angle after the preset duration and capture the image. Based on rotation features of the first camera and the second camera in this implementation, the two cameras are controlled, through one piece of control signaling, to rotate to capture the panoramic image outside the vehicle. This can meet a requirement of a driver or a passenger for panoramic photographing outside the vehicle.

In an implementation, the method further includes: receiving, by the control apparatus, second image data and third image data that are from the image shooting apparatus, where the second image data is obtained by capturing, by the first camera, an image outside the vehicle, and the third image data is obtained by capturing, by the second camera, an image outside the vehicle; performing, by the control apparatus, splicing processing on the second image data and the third image data, to obtain the panoramic image outside the vehicle; and controlling a display to display the panoramic image outside the vehicle.

In an implementation, the image shooting apparatus includes at least a first camera, the mode is the driver photographing mode, and the first control signaling is used to control the first camera to rotate to a seventh preset angle. After the sending, by the control apparatus, the first control signaling to the image shooting apparatus, the method further includes: receiving fourth image data from the image shooting apparatus; detecting that the fourth image data includes a face image and the face image meets a first preset condition; and sending seventh control signaling to the image shooting apparatus, where the seventh control signaling is used to control the first camera to perform a photographing operation. Based on a rotation feature of the first camera in this implementation, a photographing requirement of the driver position can be met, and a driver photograph at an optimal angle can be photographed.

In an implementation, the instruction is the voice instruction, and the seventh preset angle is determined based on a position at which the voice instruction is sent.

In an implementation, the method further includes: receiving, by the control apparatus, fifth image data from the image shooting apparatus; processing the fifth image data to obtain a driver image of the vehicle; and controlling a display to display the driver image.

In an implementation, the image shooting apparatus includes at least a first camera, the mode is the front passenger photographing mode, and the first control signaling is used to control the first camera to rotate to an eighth preset angle. After the sending, by the control apparatus, the first control signaling to the image shooting apparatus, the method further includes: receiving, by the control apparatus, sixth image data from the image shooting apparatus, detecting that the sixth image data includes a face image and the face image meets a first preset condition, and sending seventh control signaling to the image shooting apparatus, where the seventh control signaling is used to control the first camera to perform a photographing operation. Based on a rotation feature of the first camera in this implementation, a photographing requirement of the front passenger position can be met, and a passenger image of the front passenger position at an optimal angle can be photographed.

In an implementation, the instruction is the voice instruction, and the eighth preset angle is determined based on a position at which the voice instruction is sent.

In an implementation, the method further includes: receiving, by the control apparatus, sixth image data from the image shooting apparatus; processing the sixth image data to obtain a passenger image of a passenger position of the vehicle; and controlling a display to display the passenger image of the front passenger position.

In an implementation, the image shooting apparatus includes at least a first camera, the mode is the video call mode, and the first control signaling indicates the first camera to rotate to an angle corresponding to a video call object. Based on a rotation feature of the first camera in this implementation, a video call requirement of a driver or a passenger can be met.

In an implementation, before the sending the first control signaling to the image shooting apparatus, the method further includes: identifying, by the control apparatus, a video call object based on a seat state of the vehicle and/or a voice collected by a microphone. In this implementation, a position of the video call object may be automatically identified.

In an implementation, the image shooting apparatus includes a first camera and a second camera, the mode selected by the user is the dual-camera video mode, and the first control signaling is used to control the first camera to rotate to an angle corresponding to a driver position, and control the second camera to rotate to face the outside of the vehicle. Alternatively, the first control signaling is used to control the first camera to rotate to an angle corresponding to a front passenger position, and control the second camera to rotate to face the outside of the vehicle. Alternatively, the first control signaling is used to control the first camera to rotate to an angle corresponding to a driver position, and control the second camera to rotate to an angle corresponding to a front passenger position. According to this implementation, when the driver mode or the front passenger mode is enabled, one camera faces the inside of the vehicle, and the other camera faces the outside of the vehicle. This can meet a requirement for synchronous photographing of front and rear dual scenarios, and provide an optimal video angle. When the two-person mode is enabled, photographing requirement requirements of a driver and a front passenger can be met and the optimal video angle of the driver and the front passenger can be provided.

In an implementation, the mode is the privacy mode, and the first control signaling is used to control the image shooting apparatus to retract the at least one camera. A pop-up camera may pop up when a user needs to use the camera, and can be lowered and retracted when the user does not need to use the camera. In this way, user privacy can be completely protected when the camera is retracted.

In an implementation, the image shooting apparatus further includes a third camera, and the third camera is in a pop-up state when the vehicle is started and faces outside the vehicle. This allows continuous monitoring of the outside of the vehicle.

According to a third aspect, an embodiment of this application further provides a control apparatus. The control apparatus includes a module/unit for performing the method according to the first aspect and the second aspect, and any design of the first aspect and the second aspect. These modules/units may be implemented by using hardware, or may be implemented by executing corresponding software by hardware.

According to a fourth aspect, an embodiment of this application further provides a control apparatus, where the control apparatus includes a processor and a memory, the memory is configured to store computer execution instructions, and when the control apparatus runs, the processor executes the computer executable instructions in the memory, to perform operation steps of the method according to the first aspect and the second aspect, and any design of the first aspect and the second aspect by using a hardware resource in the control apparatus.

According to a fifth aspect, an embodiment of this application further provides a multimedia apparatus, including the control apparatus and the image shooting apparatus according to the third aspect. The image shooting apparatus includes at least two cameras; and the control apparatus is configured to control the image shooting apparatus.

In an implementation, the multimedia apparatus further includes a screen component.

In an implementation, the image shooting apparatus is disposed on the screen component.

In an implementation, the control apparatus is disposed in the screen component; or the control apparatus is disposed in a cockpit controller and is connected to the screen component.

According to a sixth aspect, an embodiment of this application further provides a cockpit/vehicle, including a cockpit controller and a cockpit display component, where the cockpit controller or the cockpit display component includes the control apparatus according to the third aspect.

According to a seventh aspect, an embodiment of this application provides a computer-readable storage medium, where the computer-readable storage medium includes computer instructions, and when the computer instructions are run on an electronic device, the electronic device is enabled to perform the technical solutions in the first aspect and the second aspect, and any design of the first aspect and the second aspect of the embodiments of this application.

According to an eighth aspect, an embodiment of this application provides a program product, including instructions. When the program product runs on an electronic device, the electronic device is enabled to perform the technical solution in the first aspect and the second aspect and any design of the first aspect and the second aspect of the embodiments of this application.

According to a ninth aspect, a chip system is provided. The chip system may include a processor. The processor is coupled to a memory, and may be configured to perform the method in the first aspect and the second aspect and any implementation of the first aspect and the second aspect. Optionally, the chip system further includes a memory. The memory is configured to store a computer program (which may also be referred to as code or instructions). The processor is configured to invoke and run the computer program from the memory, so that the device installed with the chip system performs the method in the first aspect and the second aspect and any implementation of the first aspect and the second aspect.

In an implementation process, the control apparatus may be a chip. An input circuit may be an input pin. An output circuit may be an output pin. The processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Implementations of the processor and the various circuits are not limited in embodiments of this application.

DESCRIPTION OF EMBODIMENTS

Figure 1:
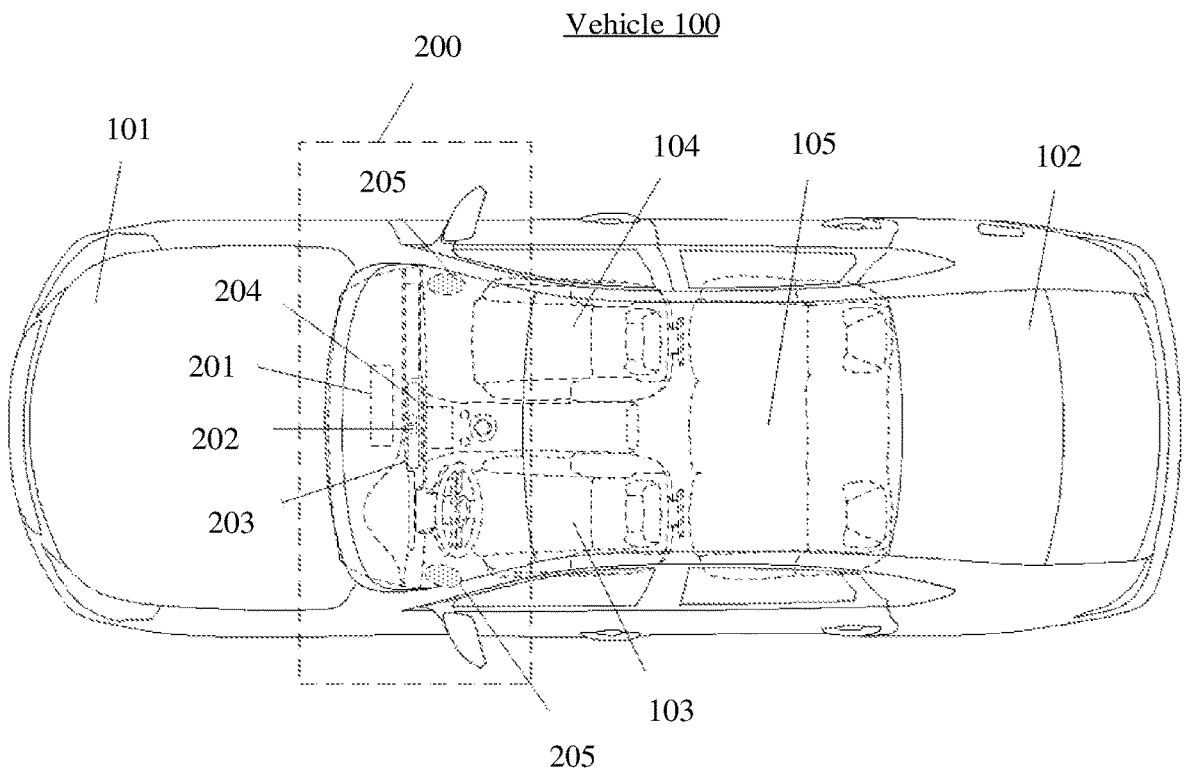
FIG. 1 is a top view of a vehicle according to an embodiment of this application.

The following further describes in detail this application with reference to accompanying drawings. It is clear that the described embodiments are some but not all of embodiments of this application. An operation method in a method embodiment may also be applied to an apparatus embodiment. In descriptions of embodiments of this application, a person of ordinary skill in the art may understand that various reference numerals such as "first" and "second" in this application are merely used for differentiation for ease of description, and are not used to limit the scope of embodiments of this application, and are not used to represent a sequence. "A plurality of" means two or more. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. "At least one" means one or more. "At least two" means two or more. "At least one", "any one", or a similar expression thereof indicates any combination of the items, and includes a singular item (piece) or any combination of plural items (pieces).

In this embodiment of this application, the vehicle may communicate with another object based on a vehicle-to-everything (V2X) wireless communication technology. For example, communication between a vehicle and a spectator side terminal device may be implemented based on an inter-vehicle wireless communication technology (for example, vehicle to vehicle (V2V)). Communication between a vehicle and another object may be performed based on wireless fidelity (Wi-Fi), a fifth generation (5G) mobile communication technology, long term evolution (LTE), or the like.

Currently, a camera installed inside a vehicle is located at a fixed position. For example, a driver surveillance camera is installed at an A-pillar position. For another example, a camera is installed at a rearview mirror position to photograph a situation inside the vehicle. In addition, after the camera is installed, a field of view is fixed, and flexible control cannot be achieved.

To resolve the foregoing problem, in this embodiment of this application, an image shooting apparatus that can pop up and rotate is disposed in a cockpit, and a space state of a camera of the image shooting apparatus is controlled by using control signaling, so that the space state of the image shooting apparatus meets a requirement of a user for a multimedia scenario. Further, the image shooting apparatus may include at least two cameras, and space states of some or all of the cameras are controlled by using control signaling, so that states of the cameras can more easily meet requirements of different demand scenarios of the user, and more multimedia scenarios are provided for the user. This greatly improves user experience.

For example, an embodiment of this application provides a control method. The method may be performed by a control apparatus. The control apparatus may be disposed at any position in a cockpit, for example, may be integrated into a vehicle-mounted smart screen, or may be integrated into a controller of a central control screen, or may be arranged in the cockpit as an independent controller, or integrated with other control device in the cockpit. The method includes: obtaining an instruction and/or cockpit information, generating control signaling according to the instruction and/or the obtained cockpit information, and then controlling a space state of at least one camera of the image shooting apparatus in the cockpit by using the control signaling, so that the at least one camera of the image shooting apparatus is flexibly controlled, the flexible change of the space state of the camera can meet a requirement of a user for different multimedia scenarios, and user experience is improved.

This embodiment of this application may be applied to an entire vehicle system. FIG. 1 is a top view of a vehicle according to an embodiment of this application.

As shown in FIG. 1, the vehicle 100 includes a front 101, a rear 102, and a cockpit between the front 101 and the rear 102. An interior of the cockpit includes a seat 103 in a driver position, a seat 104 in a front passenger position, seats 105 in rear seat positions behind the seat 103 in the driver position and the seat 104 in the front passenger position, and a cockpit system 200 in front of the seat 103 in the driver position and the seat 104 in the front passenger position.

Figure 2:
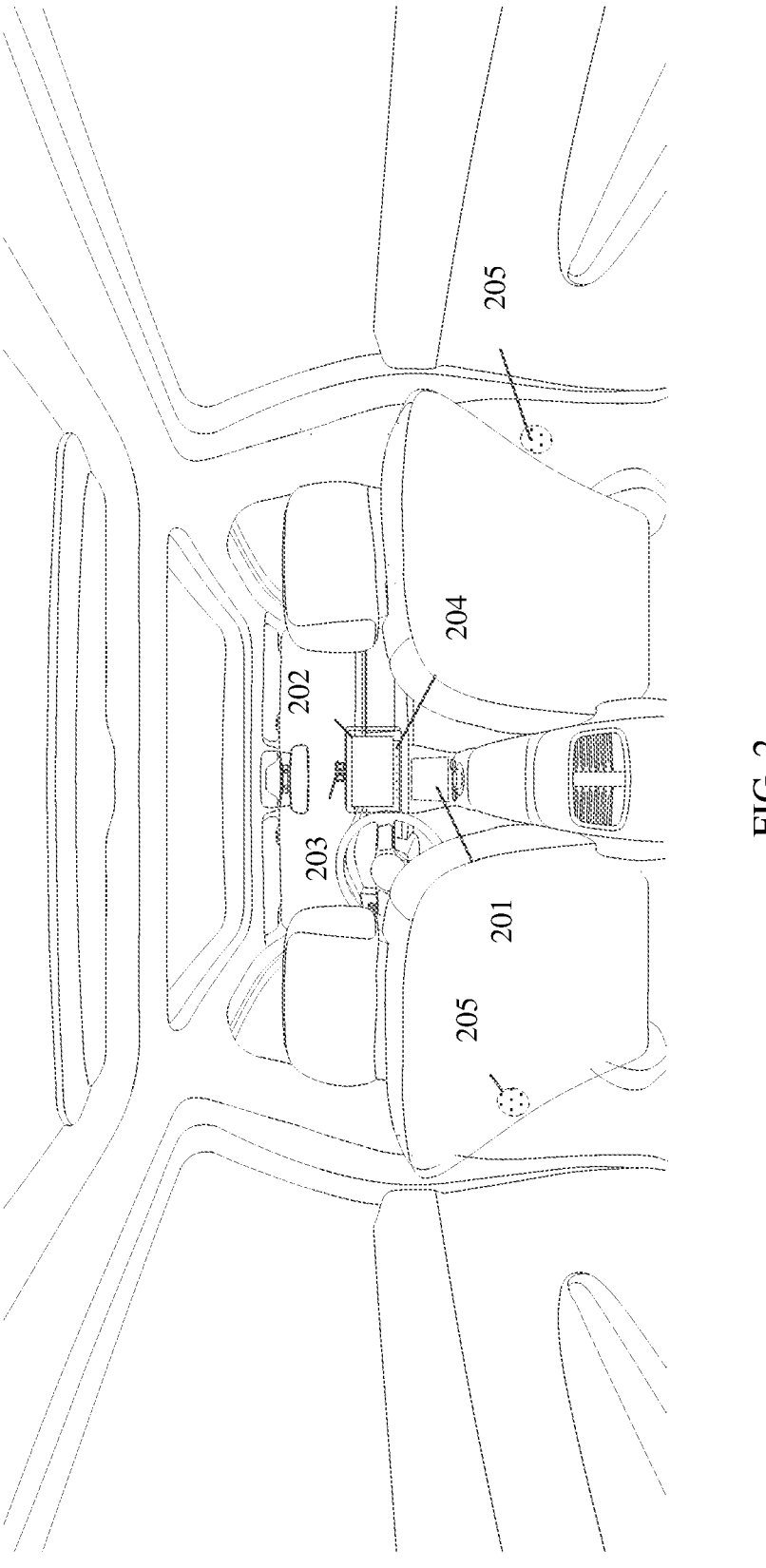
FIG. 2 is a schematic diagram of a cockpit system according to an embodiment of this application.

The cockpit system 200 inside the vehicle shown in FIG. 1 is partially enlarged below. As a schematic diagram of the cockpit system shown in FIG. 2, the cockpit system 200 includes a cockpit controller 201, a vehicle-mounted display 202, an image shooting apparatus 203, a microphone array 204, and a loudspeaker 205.

Figure 3:
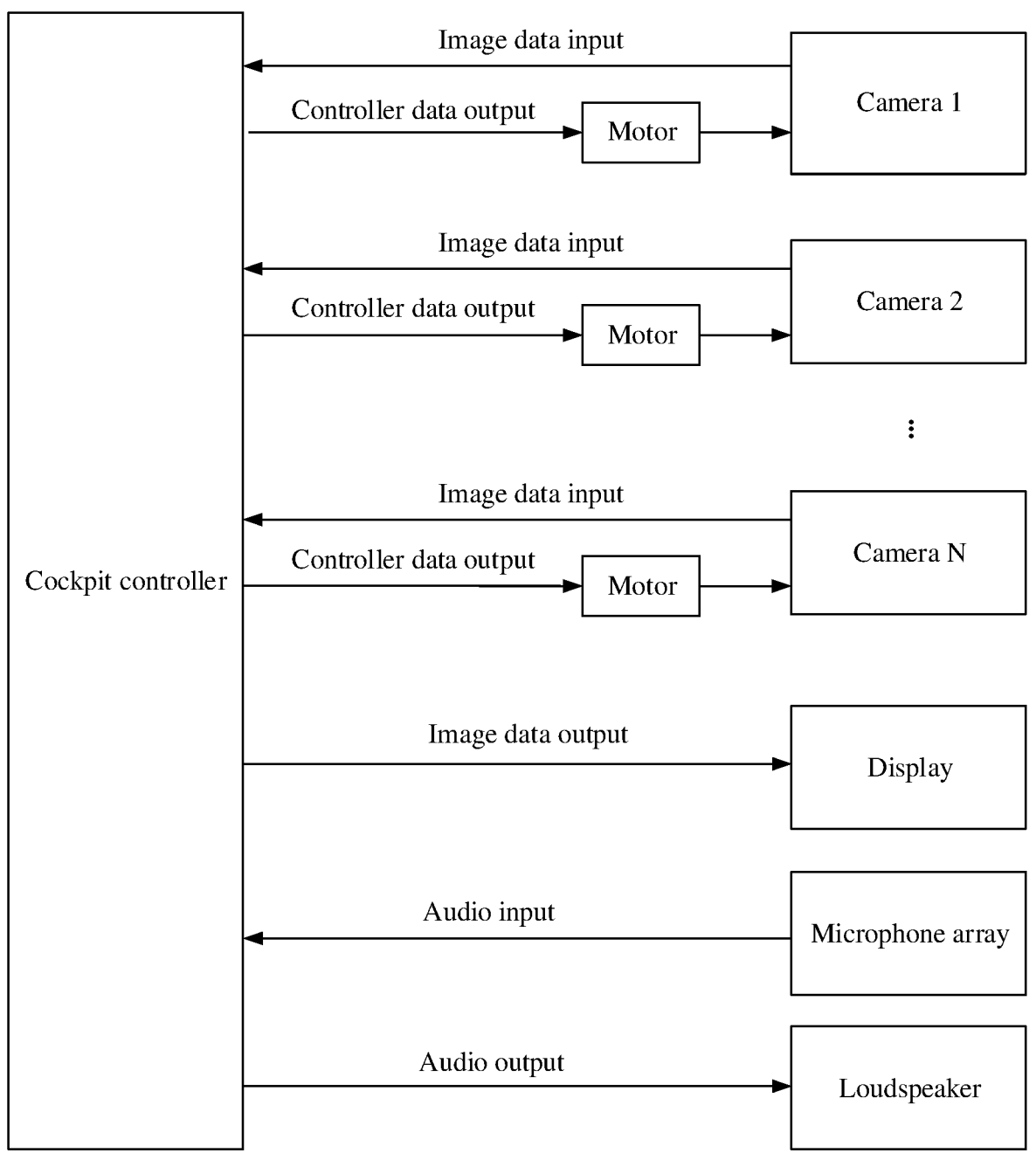
FIG. 3 is a schematic diagram of a cockpit system according to an embodiment of this application.

Functions that can be implemented by each component in the cockpit system 200 are described below with reference to FIG. 3.

The cockpit controller 201 has a data processing capability, can analyze and process data collected by a sensor, and control another device based on a data processing result. For example, in this embodiment of this application, the cockpit controller 201 may receive image data captured by a camera, and store the image data after calculation processing. The image data may include a picture or video information captured by the camera. The cockpit controller 201 may further push the image data captured by the camera to a display for display. For another example, the cockpit controller 201 may receive and process audio collected by a microphone, where the audio includes sound information, and different operations are performed for different sound instructions. For another example, the cockpit controller 201 may output control signaling, configured to control a motor, so as to control a space state of a camera of the image shooting apparatus 203 by using the motor, for example, control the camera to pop up and/or rotate. In this way, the space state of the camera is adjusted or changed. The rotation includes horizontal rotation (or referred to as angle adjustment) and vertical rotation (or referred to as angle adjustment). It should be understood that the cockpit controller 201 in this embodiment of this application may be implemented by an apparatus that has a data processing capability, such as a processor. This is not limited in this application.

The vehicle-mounted display 202 is a display device, and is configured to display information such as an image or data to a user, for example, display a signal processed by the cockpit controller on the screen by using a transmission device.

The image shooting apparatus 203 may include one camera or at least two cameras. The camera is an image capture component, and converts captured image data into a digital signal that can be identified by a processing device (for example, the cockpit controller 201, or a processor of the vehicle-mounted display 202) by using a photosensitive component and a control component. For example, FIG. 3 shows N cameras, and N is greater than or equal to 2. In this embodiment of this application, each camera may independently pop up or rotate. Alternatively, a plurality of cameras may pop up together, and each camera may rotate separately. Alternatively, a plurality of cameras may pop up and rotate together. Independent control or overall control of the cameras is not limited, and flexible control can be performed to improve control efficiency.

The cockpit controller 201 may control the image shooting apparatus 203 by using a driving member. The driving member is, for example, a motor. The motor is an electromagnetic device that converts electric energy into mechanical energy, and is configured to drive the camera to pop up and/or rotate. An independent motor may be provided for each camera, or more than one camera may be controlled by one motor. In addition, a behavior of the camera may be controlled by the independent motor, for example, lifting, horizontal rotation, and vertical rotation of the camera may be controlled by the independent motor. Alternatively, a plurality of behaviors of the camera may be controlled by using one motor. For example, one motor drives lifting and rotation of the camera based on different signals, or one motor drives horizontal rotation and vertical rotation of the camera based on different signals. A quantity of motors is not limited in this embodiment of this application. The driving member may be a part of the image shooting apparatus 203, or may be independent of the image shooting apparatus 203.

For example, in an implementation, when the image shooting apparatus 203 includes one camera, a plurality of independent motors and a mechanical structure may be used to control lifting, horizontal rotation, and vertical rotation of the camera. One motor is configured to control raising and lowering of the camera, another motor is configured to control vertical rotation of the camera, and another motor is configured to control horizontal rotation of the camera, for example, rotation from −180° to +180°. The horizontal rotation may be understood as an angle change or adjustment of the camera in a horizontal direction, and a value of the angle change may be adjusted as required. In an example, an angle in an initial state when the camera is turned on is used as a reference angle, where the reference angle is, for example, 0°. An angle of a clockwise change in the horizontal direction is "+", and an angle of a counterclockwise change is "−"; or vice versa, an angle of a clockwise change in the horizontal direction is "−", and an angle of a counterclockwise change is "+". An angle that changes in a vertical direction upward is "+", and an angle that changes in the vertical direction downward is "−"; or vice versa, an angle that changes in a vertical direction upward is "−", and an angle that changes in the vertical direction downward is "+". For example, the initial state is a state when the camera is activated. In this case, the camera may face a center position between the seat 103 in the driver position and the seat 104 in the front passenger position in the cockpit, and an included angle between the camera and the horizontal direction is 0. Certainly, another reference angle may alternatively be set. For example, when a lens of the camera pops up and is parallel to a plane on which the display is located, an angle is set to 0 degrees (°). Alternatively, an angle of an initial position when the lens is turned on is set to 0°. For example, an angle perpendicular to the horizontal direction and perpendicular to a cross section of the cockpit is 0°. This is not limited in this embodiment of this application.

The microphone array 204 is an implementation of a sound sensor, and the foregoing microphone array 204 may be replaced with another sound sensor. The sound sensor is a sound collection component, and is an energy conversion device that can convert a sound signal into an electrical signal. The microphone array 204 may input collected audio to the cockpit controller 201.

The loudspeaker 205 is an energy conversion device that converts an electrical signal into a sound signal, and the cockpit controller 201 may output audio to the loudspeaker 205 for output by using the loudspeaker 205.

Figure 4:
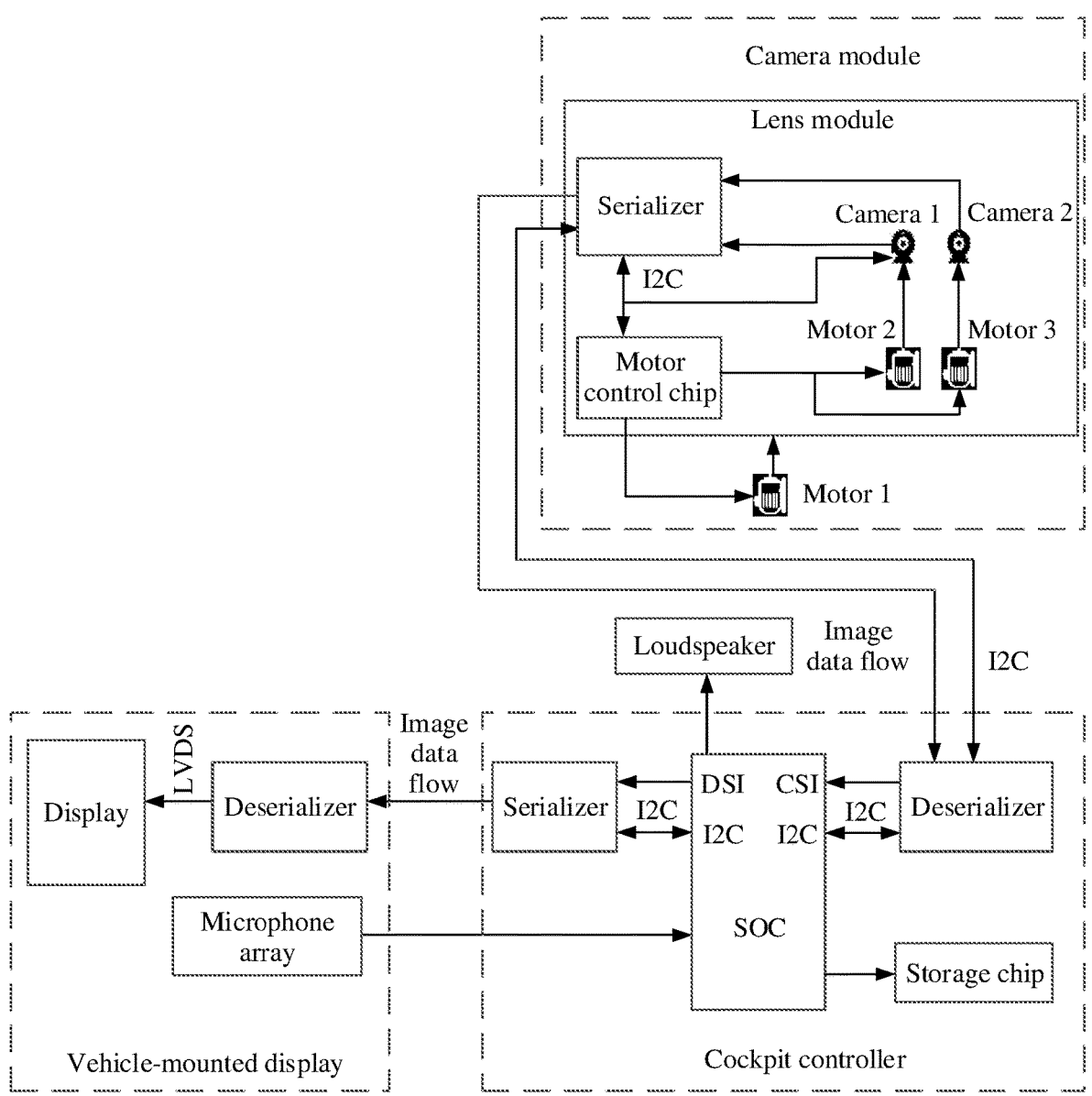
FIG. 4 is a product apparatus diagram of a cockpit system according to an embodiment of this application.

Based on the foregoing content, the following uses a passenger car cockpit as an example to provide a product apparatus diagram of a cockpit system shown in FIG. 4. Persons skilled in the art may apply, according to the teachings, this product apparatus to other device space with multimedia requirements, to implement diversified multimedia requirements. Such space may be collectively referred to as a cockpit.

The image shooting apparatus 203 may also be referred to as a camera module. The camera module may be a separate module, and may be installed on a housing of the vehicle-mounted display 202. The camera module is connected to the cockpit controller 201 through wired or wireless communication, for example, connected to the cockpit controller 201 by using a cable, or connected to the cockpit controller 201 in a wireless manner (for example, a technology such as Bluetooth or Wi-Fi), for exchanging information. The vehicle-mounted display 202 (referred to as a display below) is installed on a center console by using a support. A microphone array 204 is disposed at a lower edge of the vehicle-mounted display 202, and the vehicle-mounted display 202 and the microphone array 204 are separately connected to the cockpit controller 201 by using cables. Certainly, the camera module 203 may alternatively be integrated on the vehicle-mounted display 202. This is not limited herein. In some other embodiments, the microphone array 204 may alternatively be a separate module, and is separately connected to the vehicle-mounted display 202 and the cockpit controller 201.

Figure 5:
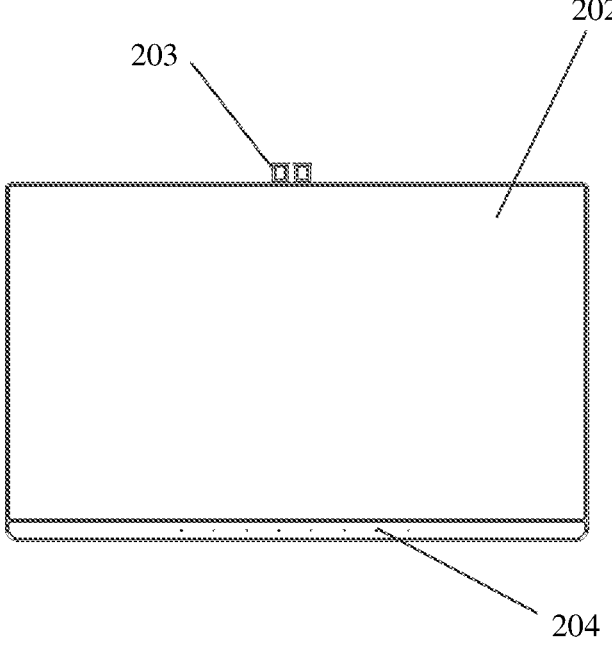
FIG. 5 is a schematic diagram of a vehicle-mounted display according to an embodiment of this application.

For example, as shown in FIG. 5, the camera module 203 is installed above the vehicle-mounted display 202, and the microphone array 204 is disposed on the lower edge of the vehicle-mounted display 202. FIG. 5 is only an example, and does not limit a relationship between installation positions of the camera module, the microphone array, and the vehicle-mounted display.

The camera module may include one or more cameras, and may be configured to take photos or record videos, and may obtain a single image or a continuous video. In FIG. 4, an example in which the camera module includes two cameras is used for description. A camera 1 and a camera 2 are disposed on a same support and may pop up together, and supports independent rotation. For example, a rotation angle range of the camera in a horizontal direction may be −180° to +180°. The camera can be stopped at any angle. In some other embodiments, the cameras included in the camera module may alternatively be disposed on different supports. For example, the camera 1 and the camera 2 are separately disposed on two supports. In this way, the camera 1 and the camera 2 can be separately controlled to pop up and retract.

For example, when the camera module is in a power-off state, the camera module may lower to a retracted state. After the cockpit system is powered on and the cockpit controller is started, the cockpit controller may control the camera to enter an initial state. For example, a system on chip (SOC) of the cockpit controller sends a command to a motor control chip by using an inter-integrated circuit (I2C) bus channel. The motor control chip controls a motor 1 to start, and controls the entire camera module to pop up by using the motor 1. The camera module can be used after initialization is completed. In this case, the camera is in the initial state. The horizontal and vertical rotation angles are 0. The motor control chip may further control a rotation angle in a horizontal direction and a rotation angle in a vertical direction of the camera 1 by using a motor 2, and control a rotation angle in a horizontal direction and a rotation angle in a vertical direction of the camera 2 by using a motor 3.

Figure 6:
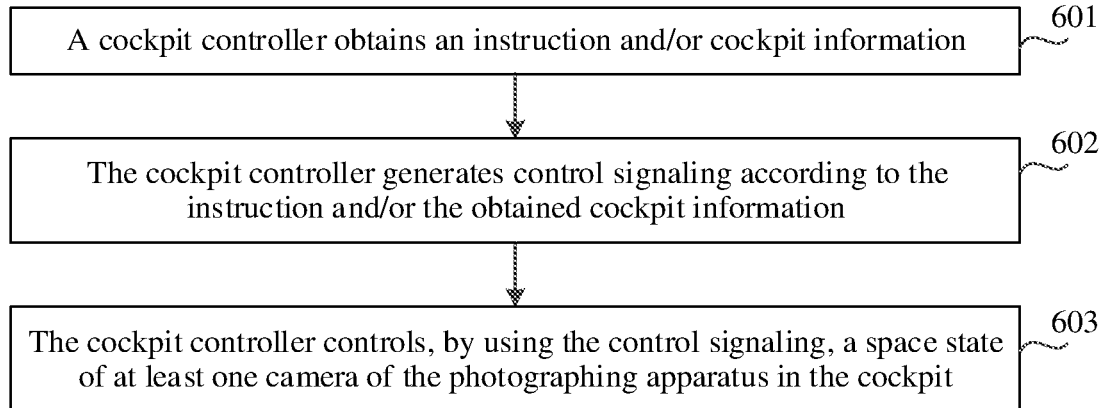
FIG. 6 is a schematic flowchart of a control method according to an embodiment of this application.

Based on the foregoing content, the following describes a control method provided in an embodiment of this application. The method may be performed by a control apparatus or a component (such as a chip or a circuit) of a control apparatus. For ease of description, an example in which the control apparatus performs the method is used below for description. The method is used to control an image shooting apparatus, and the image shooting apparatus includes one camera or at least two cameras. As shown in FIG. 6, the method includes the following steps.

Step 601: A control apparatus obtains an instruction and/or cockpit information.

The following uses an example in which the control apparatus is a cockpit controller for description.

Optionally, the instruction may be implemented in a plurality of manners.

In an implementation, the instruction may be a voice instruction, or may be an instruction obtained by processing the voice instruction. For example, a voice sensor in a cockpit may detect a voice instruction of a person in the cockpit, and directly send the voice instruction to the control apparatus or send a processed voice instruction to the control apparatus. For example, the voice instruction may be "Hey Celia, enable a panoramic photographing mode in the cockpit", or may be another voice. This is not limited herein. A microphone in the cockpit receives the voice instruction, and sends the voice instruction to the cockpit controller. The cockpit controller generates corresponding control signaling, so as to enable the panoramic photographing mode in the cockpit.

In another implementation, the instruction may be an instruction input on a user interface, or may be an instruction obtained by processing an instruction input on a user interface.

In still another implementation, the instruction may be implemented by triggering a button in the cockpit by a driver or a passenger in the cockpit. For example, buttons with various functions are disposed in the cockpit, and the cockpit controller detects a pressing operation on a button, and generates a corresponding instruction.

In still another implementation, the instruction may be a received signal, and the user may directly or indirectly transmits the instruction to the control apparatus in a form of a signal by using another apparatus, for example, a mobile phone. For example, the vehicle-mounted smart screen is separated from the controller. The mobile phone sends a signal to the vehicle-mounted smart screen, and then the vehicle-mounted smart screen sends the signal to the controller.)

The cockpit information in step 601 may include but is not limited to any one or more of the following content: sound information in the cockpit, image information in the cockpit, a seat state in the cockpit, and a running state of a vehicle in which the cockpit is located.

The sound information may include a direction of a sound source, for example, from a driver position, a front passenger position, or a rear seat position. The image information may include information about whether there is a person in the driver position, the front passenger position, or the rear seat position, and whether there is a person speaking. The running state of the vehicle in which the cockpit is located may include whether the vehicle is running.

In an implementation, the instruction in the step 601 may be used to indicate a mode, and the mode indicated by the instruction includes one or more of the following modes: a panoramic photographing mode in the cockpit, a panoramic photographing mode outside a vehicle, a driver photographing mode, a front passenger photographing mode, a video call mode, a dual-camera video mode, or a privacy mode.

Step 602: The control apparatus generates control signaling according to the instruction and/or the obtained cockpit information.

In an implementation, the cockpit controller may generate the control signaling according to the instruction.

In another implementation, the cockpit controller may generate the control signaling based on the obtained cockpit information.

In still another implementation, the cockpit controller may generate the control signaling according to the instruction and the obtained cockpit information.

Step 603: The control apparatus controls, by using control signaling, a space state of at least one camera of the image shooting apparatus in the cockpit.

During implementation, when the image shooting apparatus includes one camera, a space state of the camera of the image shooting apparatus is controlled by using control signaling. When the image shooting apparatus includes at least two cameras, space states of some or all of the cameras may be controlled by using control signaling.

Herein, the space state includes any one of the following: an angle, a position, and an angle and a position. For example, the angle may be a rotation angle in a horizontal direction or a rotation angle in a vertical direction, and the position may be a position when the camera is in a pop-up state or a position when the camera is in a retracted state. In this way, the control apparatus may implement rotation control and/or pop-up control on the camera included in the image shooting apparatus.

In step 603, the control may be direct control, or may be indirect control. For example, a motor is controlled by using control signaling to control a position and/or an angle of the camera.

In this embodiment of this application, an image shooting apparatus that can pop up and rotate is disposed in the cockpit, and a space state of a camera of the image shooting apparatus is controlled by using control signaling, so that the space state of the image shooting apparatus meets a requirement of a user for a multimedia scenario. Further, the image shooting apparatus may include at least two cameras, and space states of some or all of the cameras are controlled by using control signaling, so that states of the cameras can more easily meet requirements of different demand scenarios of the user, and more multimedia scenarios are provided for the user. This greatly improves user experience.

Based on the foregoing embodiment, in the foregoing step 602, there are a plurality of implementations for generating, by the control apparatus, the control signaling according to the instruction and/or the obtained cockpit information. The following provides description by using the following: implementation a1, implementation a2, implementation a3, implementation a4, implementation a5, implementation a6, and implementation a7.

In the implementation a1, the mode indicated by the instruction is the panoramic photographing mode in the cockpit. In step 602, the control apparatus may generate control signaling according to the instruction. The control signaling is used to control a first camera of the image shooting apparatus to: rotate in the horizontal direction within a first preset angle range and perform a panoramic scanning of the space inside the cockpit. The first preset angle range is an angle range in which the image shooting apparatus can photograph a panoramic image of space inside the cockpit, for example, from +30° to −30° in the horizontal direction. A value of the first preset angle range is not limited in this application.

The control signaling generated by the control apparatus according to the instruction may be implemented in the following manners.

In the implementation b1, the control signaling is used to control the first camera to: rotate in the horizontal direction to a first preset angle, rotate in the first preset angle range in the horizontal direction starting from the first preset angle after preset duration, and perform panoramic scanning on the space inside the cockpit in the process of rotating within the first preset angle range.

In the implementation b2, the control signaling in step 602 includes first control signaling and second control signaling. The first control signaling is used to control the first camera to rotate in the horizontal direction to a first preset angle. The second control signaling is used to control the first camera to: rotate within the first preset angle range in the horizontal direction starting from the first preset angle, and perform panoramic scanning on the space inside the cockpit in the process of rotating within the first preset angle range.

In the implementation b2, the first control signaling and the second control signaling may be generated together. In some other embodiments. The first control signaling may be first generated based on the panoramic photographing mode in the cockpit that is indicated by the instruction, and the second control signaling is generated when a first state feedback from the image shooting apparatus is received. The first state feedback indicates the first camera to complete execution of the first control signaling.

After controlling, by using the implementation b1 or the implementation b2, the first camera to photograph first image data, the control apparatus may further receive the first image data from the image shooting apparatus, process the first image data to obtain a panoramic image, store the panoramic image, and then control a vehicle-mounted display to display the panoramic image. Certainly, the control apparatus may alternatively store the panoramic image, and does not display the panoramic image on the vehicle-mounted display.

In the foregoing several implementations, an example in which one camera (that is, the first camera) implements panoramic photographing in the cockpit is used for description. In some other embodiments, a plurality of cameras may alternatively be used to implement panoramic photographing in the cockpit. Two cameras are used as an example.

In the implementation b3, the control signaling is used to control the first camera to: rotate in the horizontal direction to a second preset angle, rotate in a third preset angle range in the horizontal direction starting from the second preset angle after preset duration, and perform panoramic scanning on the space inside the cockpit in a process of rotating within the third preset angle range; and control the second camera to: rotate in the horizontal direction to a third preset angle, rotate in a fourth preset angle range in the horizontal direction starting from the third preset angle after preset duration, and perform panoramic scanning on the space inside the cockpit in a process of rotating within the fourth preset angle range.

In the implementation b4, the control signaling in step 602 includes third control signaling and fourth control signaling. The third control signaling is used to: control the first camera to rotate in the horizontal direction to a second preset angle; and control the second camera to rotate in the horizontal direction to a third preset angle. The fourth control signaling is used to control the first camera to: rotate in a third preset angle range in the horizontal direction starting from the second preset angle, and perform panoramic scanning on the space inside the cockpit in a process of rotating in the third preset angle range; and control the second camera to: rotate in a fourth preset angle range in the horizontal direction starting from the third preset angle, and perform panoramic scanning on the space inside the cockpit in a process of rotating in the fourth preset angle range.

In the implementation b4, the third control signaling and the fourth control signaling may be generated together. In some other embodiments, the third control signaling may be first generated based on the panoramic photographing mode in the cockpit that is indicated by the instruction, and the fourth control signaling is generated when the first state feedback from the image shooting apparatus is received. The first state feedback indicates the first camera to complete execution of the third control signaling.

After controlling, by using the implementation b3 or the implementation b4, the second image data photographed by the first camera and the third image data photographed by the second camera, the control apparatus may further receive the second image data and the third image data from the image shooting apparatus, perform splicing processing to obtain and store a panoramic image in the cockpit, and then control the vehicle-mounted display to display the panoramic image in the cockpit. Certainly, the control apparatus may alternatively store the panoramic image in the cockpit, and does not display the panoramic image on the vehicle-mounted display.

In some other embodiments, at least three cameras may be used to implement panoramic photographing in the cockpit. A process is similar to a process of implementing panoramic photographing in the cockpit by the two cameras, and may refer to each other. Details are not described herein again.

It should be noted that for various preset angles (for example, the first preset angle, the second preset angle, the fourth preset angle, and other preset angles described below) involved in this embodiment of this application, and preset angle ranges (for example, the first preset angle range, the third preset angle range, the fourth preset angle range, and other preset angle ranges described below), a value is not limited in this application. Details are not described in the following description. In addition, various preset angles (for example, the first preset angle, the second preset angle, the fourth preset angle, and other preset angles described below) involved in this embodiment of this application, and preset angle ranges (for example, the first preset angle range, the third preset angle range, the fourth preset angle range, and other preset angle ranges described below) may be preset (for example, may be set before delivery, or may be set during a system upgrade), or may be determined in a plurality of manners such as determining based on an empirical value.

Figure 7:
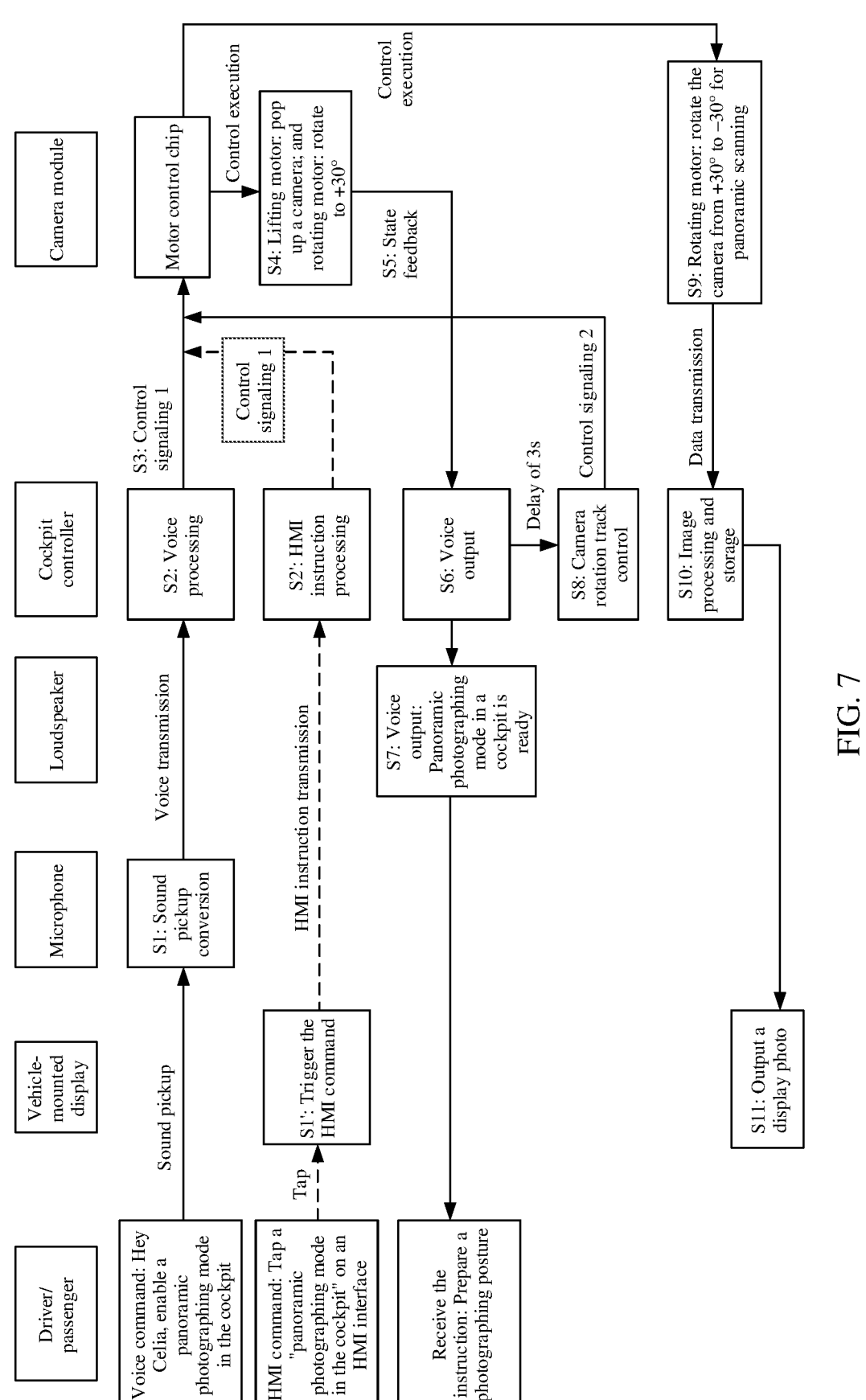
FIG. 7 is a schematic flowchart of a control method according to an embodiment of this application.

The following describes a schematic flowchart of a control method shown in FIG. 7 by using an example in which the control apparatus is a cockpit controller and with reference to a panoramic photographing mode in a cockpit.

As shown in FIG. 7, the method includes the following steps.

S1: A microphone array picks up sound, obtains a sound signal of a voice instruction, picks up and converts the sound signal into an electrical signal, and transmits the electrical signal to a cockpit controller.

For example, the voice instruction may be initiated by a driver or a passenger, and content of the voice instruction may be "Hey Celia, enable a panoramic photographing mode in a cockpit".

S2: After receiving the voice instruction, the cockpit controller processes the voice instruction to generate control signaling 1. Then, S3 continues to be performed.

In some other embodiments, the panoramic photographing mode in the cockpit may be enabled by using an instruction input on a user interface, and the foregoing S1 and S2 may be replaced with S1' and S2' respectively.

S1': A vehicle-mounted display detects a tap operation, triggers a human machine interface (HMI) instruction in response to the tap operation, and transmits the HMI instruction to the cockpit controller.

For example, the tap operation may be an operation that a driver or a passenger taps a "panoramic image photographing mode in a cockpit" on an HMI interface.

S2': After receiving the HMI instruction, the cockpit controller processes the HMI instruction to generate control signaling 1. Then, S3 continues to be performed.

S3: The cockpit controller sends the control signaling 1 to a camera module. The control signaling 1 is used to control the camera to pop up, and to rotate in a horizontal direction to a first preset angle after the camera pops up. For example, the first preset angle is +30°, and +30° indicates an angle obtained by clockwise rotation of 30° from a plane on which a display is located, or +30° indicates an angular position achieved by turning 30° horizontally.

S4: After receiving the control signaling 1, a motor control chip in the camera module controls a lifting motor to pop up the camera, and controls a rotating motor to rotate the camera to +30°.

Figure 8:
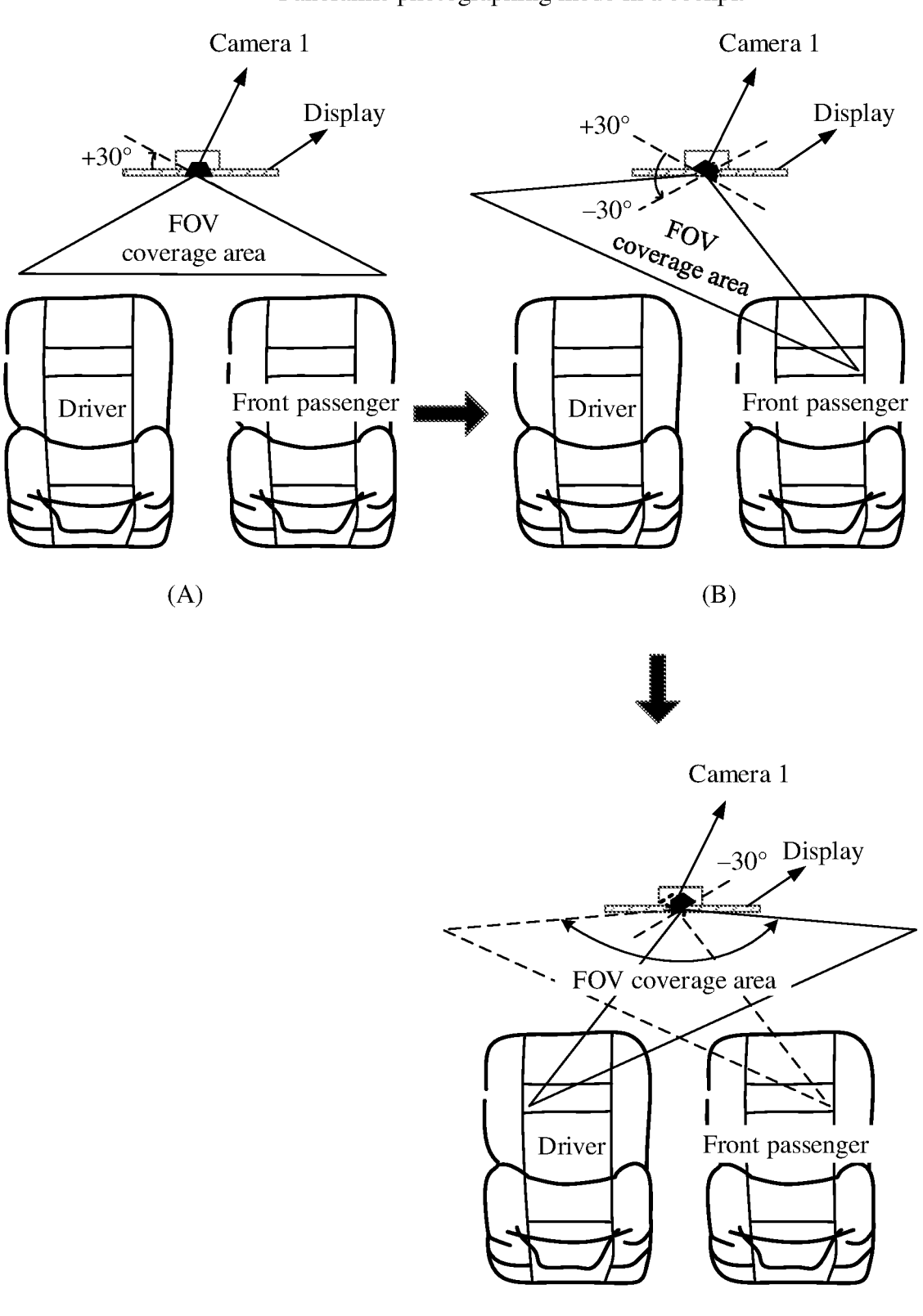
FIG. 8 is a schematic diagram of a field of view of a panoramic photographing mode in a cockpit according to an embodiment of this application.

For example, as shown in (A) in FIG. 8, the camera 1 pops up at 0°, and a field of view (FOV) coverage area of the camera 1 includes intra-cockpit space of a driver position and a front passenger position. When the camera 1 rotates clockwise in the horizontal direction to +30°, as shown in (B) in FIG. 8, the field of view (FOV) coverage area of the camera 1 mainly includes the driver position.

S5: After completing execution of the control signaling, the camera module sends a state feedback to the cockpit controller, where the state feedback indicates that the camera is ready.

S6: The cockpit controller generates voice information, and outputs the voice information to a loudspeaker, where the voice information may include "The panoramic photographing mode in the cockpit is ready". The cockpit controller may perform S8 with a delay of a period of time (for example, a delay of 3 s) starting from outputting the voice information to the loudspeaker, so as to reserve time for the driver or the passenger to prepare a photographing posture.

S7: The loudspeaker receives the voice information, and outputs a voice: The panoramic photographing mode in the cockpit is ready.

S8: The cockpit controller generates control signaling 2, and sends the control signaling 2 to the camera module, where the control signaling 2 is used to control a rotation track of the camera.

S9: After receiving the control signaling 2, the motor control chip in the camera module controls the rotating motor to rotate the camera from +30° to −30° in the horizontal direction, and simultaneously performs panoramic scanning in a rotation process of the camera. The camera module then transmits image data to the cockpit controller.

The example in FIG. 8 is used, the camera 1 rotates from +30° to −30° in the horizontal direction shown in (B) in FIG. 8, where −30° indicates an angle obtained by rotating 30° counterclockwise in the horizontal direction from the plane on which the display is located. As shown in (C) in FIG. 8, the FOV coverage area of the camera 1 covers entire space inside the cockpit in a process of rotating from +30° to −30° in the horizontal direction. The camera 1 has an adjustable angle and the FOV coverage area is wide. This can meet requirements of the drivers or passengers for panoramic photographing in the cockpit, and can photograph panoramic images of optimal angles of a driver and a front passenger.

S10: The cockpit controller performs image processing on the received image data and stores the image data, and outputs the panoramic image in the cockpit to the vehicle-mounted display.

S11: The vehicle-mounted display displays the panoramic image in the cockpit.

In the foregoing example, the cockpit controller controls the first camera to perform panoramic scanning within the first preset angle range (for example, +30° to −30°) in the horizontal direction, and then generates the panoramic image in the cockpit after being synthesized by the cockpit controller. Based on a rotation feature of the camera 1, a requirement of the driver or the passenger for panoramic photographing inside the cockpit can be met.

In an implementation a2, the mode indicated by the instruction is a panoramic photographing mode outside a vehicle. In step 602, the control apparatus may generate control signaling based on the instruction, and the control signaling is used to control the first camera of the image shooting apparatus to: rotate within a second preset angle range in the horizontal direction and perform panoramic scanning of space outside the vehicle. The second preset angle range is an angle range in which the image shooting apparatus can photograph the panoramic image of the space outside the vehicle, for example, +150° to −150° in the horizontal direction. A value of the second preset angle range is not limited in this application.

The control signaling generated by the control apparatus according to the instruction may be implemented in the following manners.

In an implementation c1, the control signaling is used to control the first camera to: rotate in the horizontal direction to a fourth preset angle, rotate in a fifth preset angle range in the horizontal direction starting from the fourth preset angle after preset duration, and perform panoramic scanning of the space outside the vehicle in a process of rotating within the fifth preset angle range.

In an implementation c2, the control signaling in step 602 includes fifth control signaling and sixth control signaling, and the fifth control signaling is used to control the first camera to rotate in the horizontal direction to a fourth preset angle. The second control signaling is used to control the first camera to: rotate within a fifth preset angle range in the horizontal direction starting from the fourth preset angle, and perform panoramic scanning on the space outside the vehicle in a process of rotating within the fifth preset angle range.

In the implementation c2, the fifth control signaling and the sixth control signaling may be generated together. In some other embodiments, the fifth control signaling may be first generated based on the panoramic photographing mode outside the vehicle that is indicated by the instruction, and the sixth control signaling is generated when a second state feedback from the image shooting apparatus is received. The second state feedback indicates the first camera to complete execution of the fifth control signaling.

After controlling, by using the implementation c1 or the implementation c2, the first camera to photograph fourth image data, the control apparatus may further receive the fourth image data from the image shooting apparatus, process the fourth image data to obtain a panoramic image outside the vehicle, store the panoramic image outside the vehicle, and then control the vehicle-mounted display to display the panoramic image outside the vehicle. Certainly, the control apparatus may alternatively store the panoramic image outside the vehicle, and does not display the panoramic image outside the vehicle on the vehicle-mounted display.

In the foregoing several implementations, an example in which one camera (that is, the first camera) implements panoramic photographing outside the vehicle is used for description. In some other embodiments, a plurality of cameras may alternatively be used to implement panoramic photographing outside the vehicle. Two cameras are used as an example.

In an implementation c3, the control signaling is used to control the first camera to: rotate in a horizontal direction to a fifth preset angle, rotate in a sixth preset angle range in the horizontal direction starting from the fifth preset angle after preset duration, and perform panoramic scanning of the space outside the vehicle in a process of rotating within the sixth preset angle range; and control the second camera to: rotate in the horizontal direction to a sixth preset angle, rotate in a seventh preset angle range in the horizontal direction starting from the sixth preset angle after preset duration, and perform panoramic scanning on the space outside the vehicle in a process of rotating within the seventh preset angle range.

In an implementation c4, the control signaling in step 602 includes seventh control signaling and eighth control signaling. The seventh control signaling is used to: control the first camera to rotate in a horizontal direction to a fifth preset angle, and control the second camera to rotate in a horizontal direction to a sixth preset angle. The eighth control signaling is used to control the first camera to: rotate in a sixth preset angle range in the horizontal direction starting from the fifth preset angle, and perform panoramic scanning on space outside the vehicle in a process of rotating in the sixth preset angle range; and control the second camera to rotate from the sixth preset angle in a horizontal direction within a seventh preset angle range, and perform panoramic scanning on space outside the vehicle in a process of rotating within the seventh preset angle range.

In the implementation c4, the seventh control signaling and the eighth control signaling may be generated together. In some other embodiments, the seventh control signaling may be first generated based on the panoramic photographing mode outside the vehicle that is indicated by the instruction, and the eighth control signaling is generated when a second state feedback is received from the image shooting apparatus. The second state feedback indicates the first camera to complete execution of the seventh control signaling.

After controlling, by using the implementation c3 or the implementation c4, the fifth image data photographed by the first camera and the sixth image data photographed by the second camera, the control apparatus may further receive the fifth image data and the sixth image data from the image shooting apparatus, perform splicing processing to obtain and store the panoramic image outside the vehicle, and then control the vehicle-mounted display to display the panoramic image outside the vehicle. Certainly, the control apparatus may alternatively store the panoramic image outside the vehicle, and does not display the panoramic image outside the vehicle on the vehicle-mounted display.

In some other embodiments, at least three cameras may be used to implement panoramic photographing outside the vehicle. A process is similar to a process of implementing panoramic photographing outside the vehicle by the two cameras, and may refer to each other. Details are not described herein again.

Figure 9:
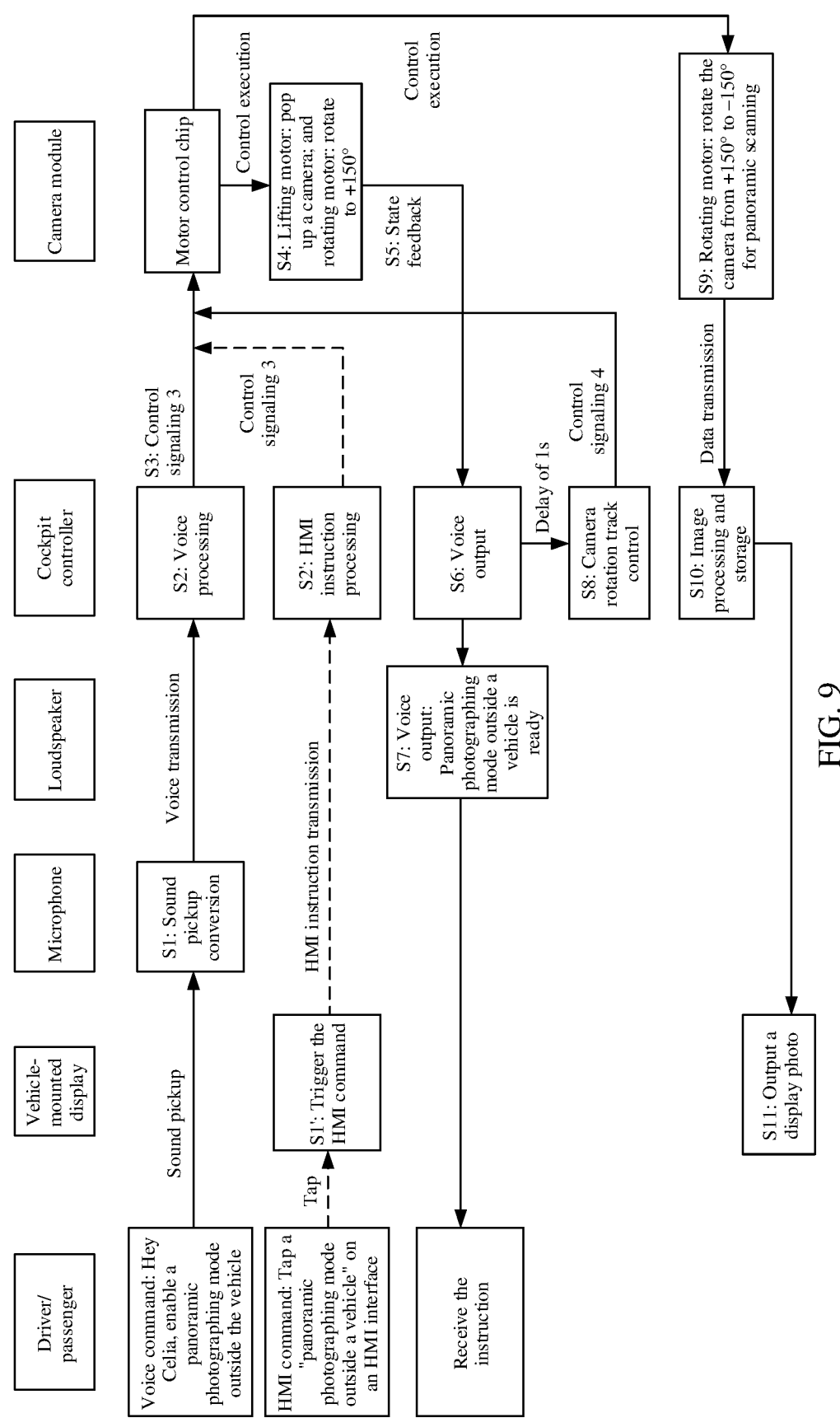
FIG. 9 is a schematic flowchart of a control method according to an embodiment of this application.

The following describes a schematic flowchart of a control method shown in FIG. 9 by using an example in which the control apparatus is a cockpit controller and with reference to a panoramic photographing mode outside the vehicle.

As shown in FIG. 9, the method includes the following steps.

S1: A microphone array picks up sound, obtains a sound signal of a voice instruction, picks up and converts the sound signal into an electrical signal, and transmits the electrical signal to a cockpit controller.

For example, the voice instruction may be initiated by a driver or a passenger, and content of the voice instruction may be "Hey Celia, enable a panoramic photographing mode outside the vehicle".

S2: After receiving the voice instruction, the cockpit controller processes the voice to generate control signaling 3. The control signaling 3 is used to control the camera to pop up, and to rotate the camera in a horizontal direction to a second preset angle after the camera pops up. For example, the second preset angle is +150°, and +150° indicates an angle obtained by clockwise rotation of 150° from a plane on which the display is located. Then, S3 continues to be performed.

In some other embodiments, the panoramic photographing mode outside the vehicle may be enabled by using an instruction input on a user interface, and the foregoing S1 and S2 may be replaced with S1' and S2' respectively.

S1': A vehicle-mounted display detects a tap operation, triggers a human machine interface (HMI) instruction in response to the tap operation, and transmits the HMI instruction to the cockpit controller.

For example, the tap operation may be an operation that a driver or a passenger taps a "panoramic image photographing mode outside the vehicle" on an HMI interface.

S2': After receiving the HMI instruction, the cockpit controller processes the HMI instruction to generate control signaling 3. Then, S3 continues to be performed.

S3: The cockpit controller sends the control signaling 3 to a camera module.

S4: After receiving the control signaling 3, the motor control chip in the camera module controls a lifting motor to pop up the camera, and controls a rotating motor to rotate the camera in a horizontal direction to +150°.

Figure 10:
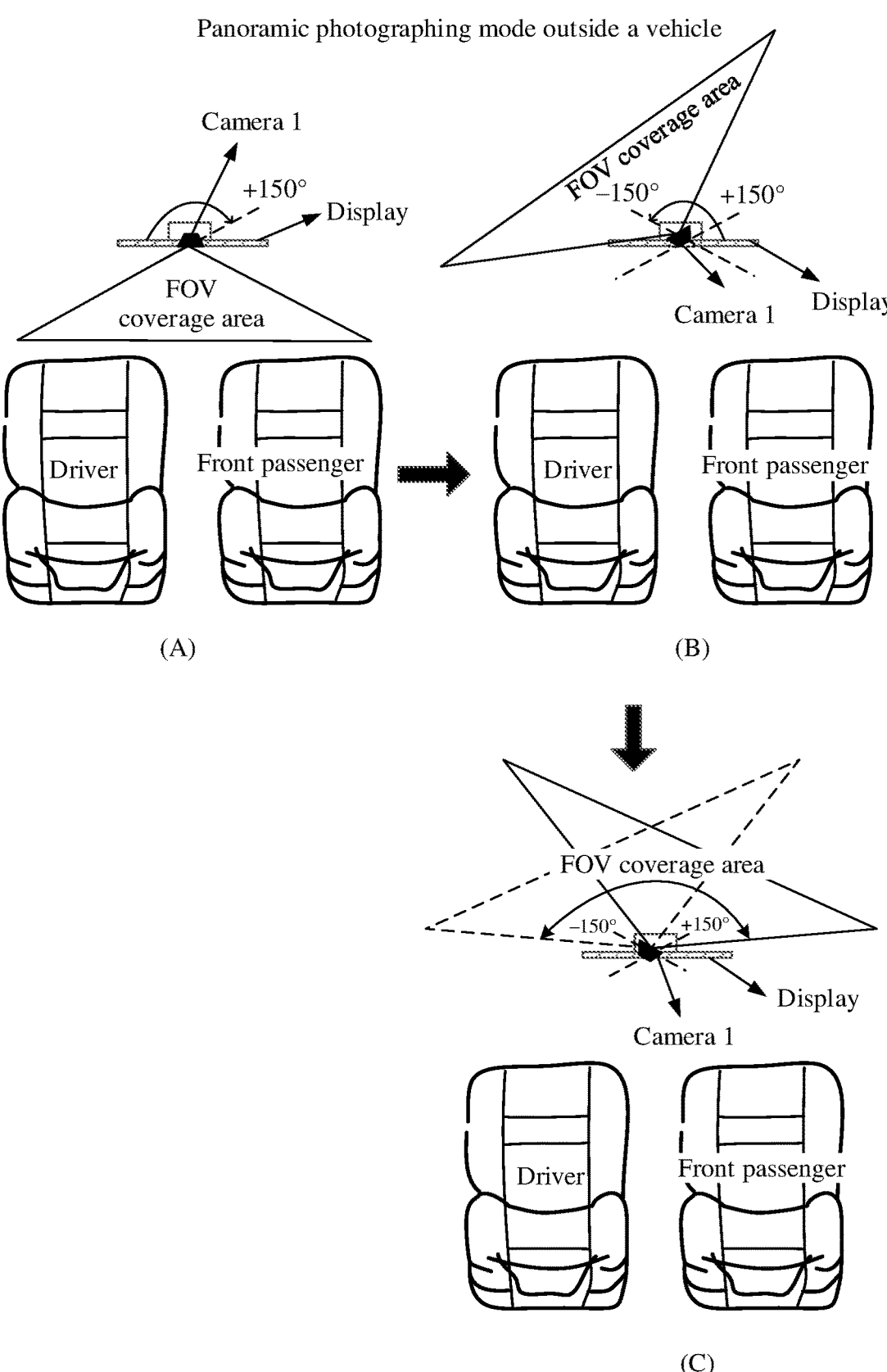
FIG. 10 is a schematic diagram of a field of view of a panoramic photographing mode outside a vehicle according to an embodiment of this application.

For example, as shown in (A) in FIG. 10, when the camera 1 pops up at 0°, an FOV coverage area of the camera 1 is cockpit space including a driver position and a front passenger position. When the camera 1 rotates clockwise in the horizontal direction to +150°, and +150° indicates an angle achieved by rotating 150° clockwise in the horizontal direction from a plane on which the display is located, as shown in (B) in FIG. 10, the field of view (FOV) coverage area of the camera 1 includes an external space in front of the driver position. In this example, a rotation angle of the camera 1 is adjustable, an angle may be customized, and an FOV coverage area is wide. A requirement of a driver or a passenger for panoramic photographing outside the vehicle can be met.

S5: After completing execution of the control signaling 3, the camera module sends a state feedback to the cockpit controller, where the state feedback indicates that the camera is ready.

S6: The cockpit controller generates voice information, and outputs the voice information to a loudspeaker, where the voice information may include "The panoramic photographing mode outside the vehicle is ready". The cockpit controller may perform S8 with a delay of a period of time (for example, a delay of 1 s) starting from outputting the voice information to the loudspeaker. S7: The loudspeaker receives the voice information, and outputs a voice: The panoramic photographing mode outside the vehicle is ready.

S8: The cockpit controller generates control signaling 4, and sends the control signaling 4 to the camera module, where the control signaling 4 is used to control a rotation track of the camera. For example, the control signaling 4 is used to control the camera to: rotate in an angle range from +150° to −150° in the horizontal direction, and perform panoramic scanning of space outside the vehicle.

Figure 11:
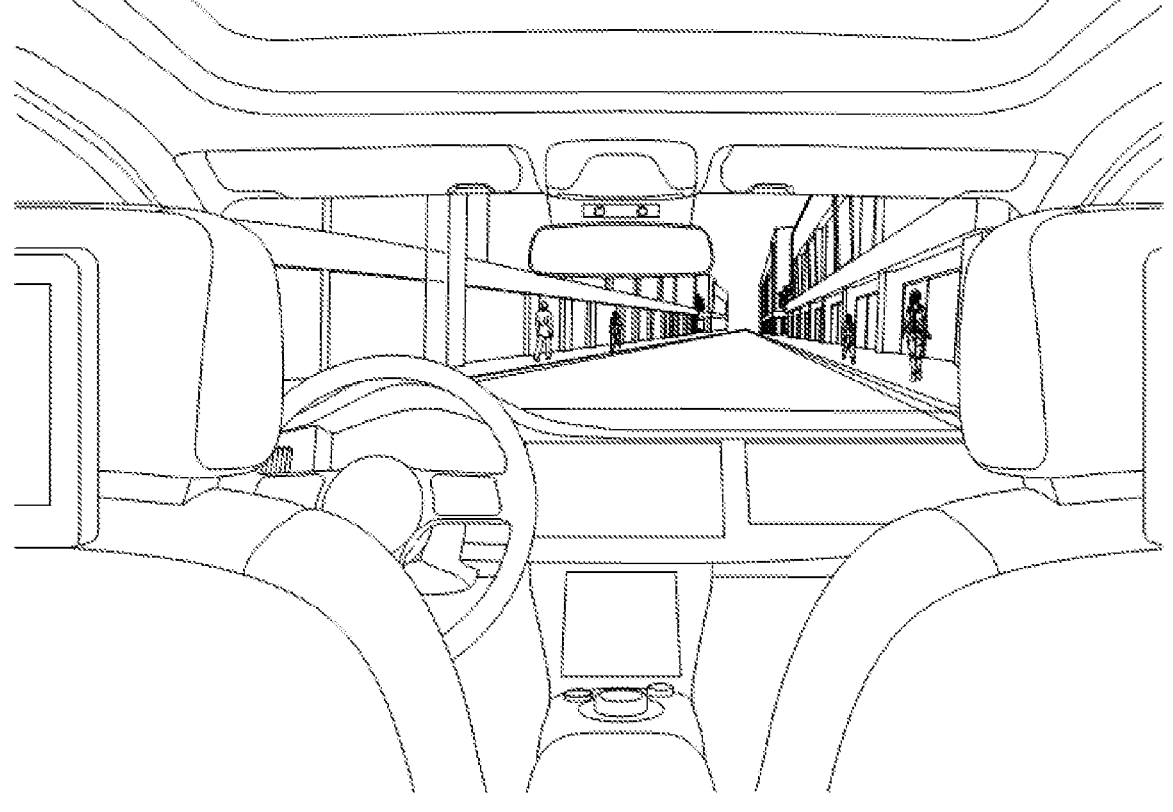
FIG. 11 is a schematic diagram of a scenario of a panoramic photographing outside a vehicle according to an embodiment of this application.

S9: After receiving the control signaling 4, the motor control chip in the camera module controls the rotating motor to rotate the camera from +150° to −150° in the horizontal direction, and simultaneously performs panoramic scanning in a rotation process of the camera, to obtain image data. The camera module then transmits image data to the cockpit controller. For example, for a panoramic photographing scenario outside the vehicle, refer to FIG. 11.

The example of FIG. 10 is used. The camera 1 rotates from +150° to −150° shown in (B) in FIG. 10, and a rotation track is +150°→+180°→−180°→−150°, where x→y indicates from x to y. −150° indicates an angle achieved by rotating 150° counterclockwise from the plane on which the display is located. As shown in (C) in FIG. 10, an FOV coverage area of the camera 1 covers external space in front of the vehicle in a process of rotating from +150° to −150° in the horizontal direction.

S10: The cockpit controller performs image processing on the received image data, stores the image data, and outputs a panoramic image outside the vehicle to the vehicle-mounted display.

S11: The vehicle-mounted display displays the panoramic image outside the vehicle.

In the foregoing example, the cockpit controller controls the first camera to perform panoramic scanning within the second preset angle range (for example, +150° to −150° in the horizontal direction) in the horizontal direction, and then generates the panoramic image outside the vehicle after being synthesized by the cockpit controller. Based on a rotation feature of the first camera, a requirement of a driver or a passenger for panoramic photographing outside the vehicle can be met.

In an implementation a3, the mode indicated by the instruction is a driver photographing mode. In step 602, the control apparatus generates control signaling according to the instruction. The control signaling is used to control the first camera of the image shooting apparatus to: rotate to face a driver position of the vehicle and perform a photographing action on the driver position. A rotation operation of controlling the first camera herein may be rotation in the horizontal direction, or may be rotation in the vertical direction, or may be rotation in both the horizontal direction and the vertical direction. Rotation is set based on an actual requirement, so that the first camera can be controlled to rotate to an optimal angle to photograph a driver image. The optimal angle is the angle at which a driver's front can be photographed and a driver is centered in a photograph.

In an implementation, that the first camera rotates in the horizontal direction is used as an example. The control signaling in step 602 includes ninth control signaling and tenth control signaling. The ninth control signaling is used to control the first camera to rotate in the horizontal direction to a seventh preset angle. The tenth control signaling is used to control the first camera to perform a photographing operation. For example, the seventh preset angle may be determined based on a position of a sound source that sends a voice instruction.

In this implementation, the ninth control signaling and tenth control signaling may be generated together. In some other embodiments, the ninth control signaling may be generated first, and then the control apparatus receives seventh image data from the image shooting apparatus, detects whether a face image included in the fourth image data meets a preset condition, and generates tenth control signaling when it is detected that the face image included in the fourth image data meets the preset condition. The preset condition may be that the face image is a front-centered image.

Further, the control apparatus may further receive eighth image data from the image shooting apparatus, where the eighth image data is obtained by the image shooting apparatus by performing a photographing operation, and then the control apparatus processes the eighth image data to obtain a driver image, and controls the vehicle-mounted display to display the driver image. Certainly, the control apparatus may alternatively store the driver image, and does not display the driver image on the vehicle-mounted display.

Figure 12:
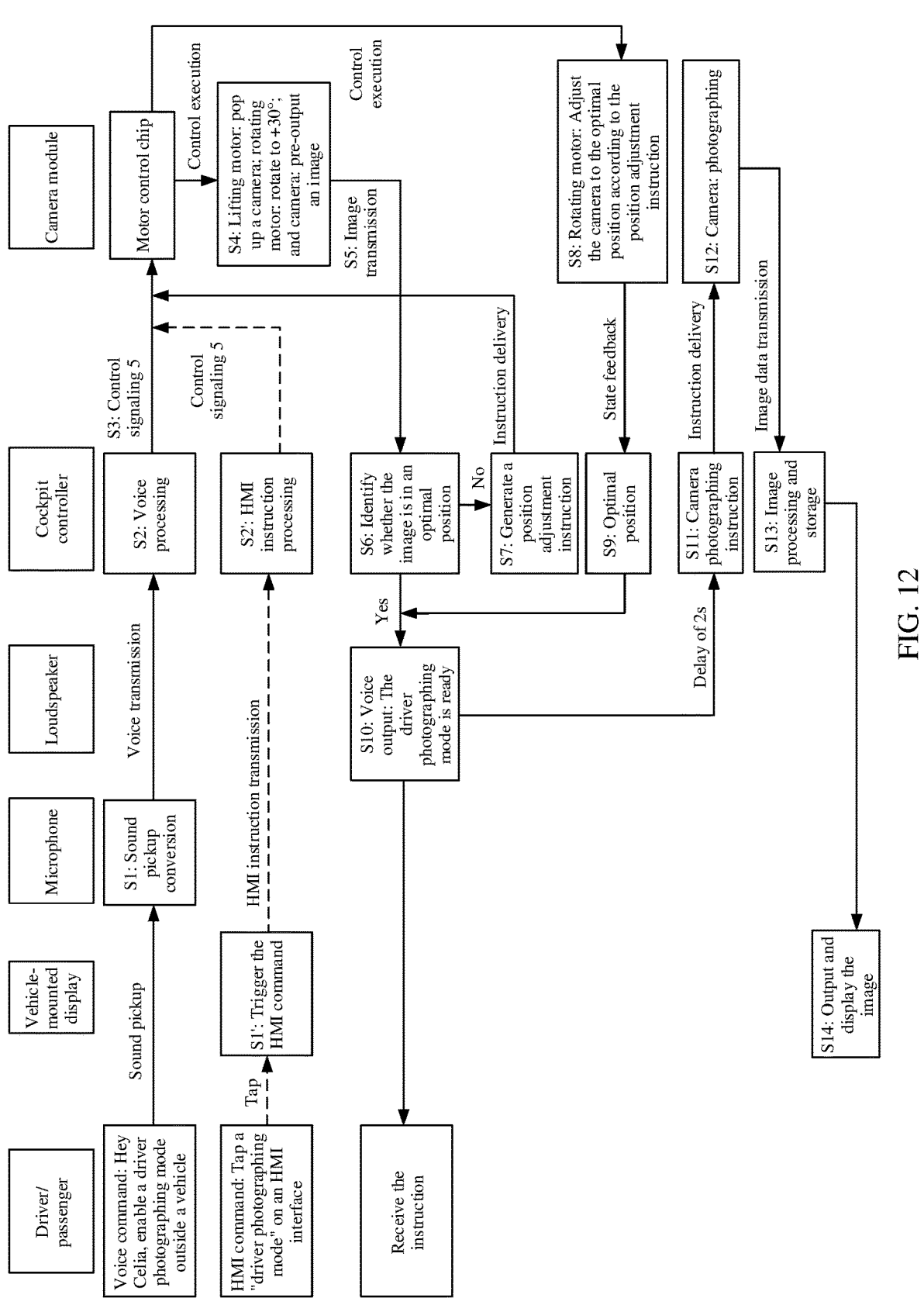
FIG. 12 is a schematic flowchart of a control method according to an embodiment of this application.

The following describes a schematic flowchart of a control method shown in FIG. 12 by using an example in which the control apparatus is a cockpit controller and with reference to a driver photographing mode.

As shown in FIG. 12, the method includes the following steps.

S1: A microphone array picks up sound, obtains a sound signal of a voice instruction, picks up and converts the sound signal into an electrical signal, and transmits the electrical signal to a cockpit controller.

For example, the voice instruction may be initiated by a driver or a passenger, and content of the voice instruction may be "Hey Celia, enable a driver photographing mode".

S2: After receiving the voice instruction, the cockpit controller processes the voice to generate control signaling 5. Then, S3 continues to be performed. The control signaling 5 is used to control the camera to pop up, and rotate the camera in a horizontal direction to a third preset angle, for example, +30° after the camera pops up.

In some other embodiments, the driver photographing mode may be enabled by using an instruction input on a user interface, and the foregoing S1 and S2 may be replaced with S1' and S2' respectively.

S1': A vehicle-mounted display detects a tap operation, triggers a human machine interface (HMI) instruction in response to the tap operation, and transmits the HMI instruction to the cockpit controller.

For example, the tap operation may be an operation that the driver or the passenger taps a "driver photographing mode" on an HMI interface.

S2': After receiving the HMI instruction, the cockpit controller processes the HMI instruction to generate control signaling 5. Then, S3 continues to be performed.

S3: The cockpit controller sends the control signaling 5 to a camera module.

S4: After receiving the control signaling 5, a motor control chip in the camera module controls a lifting motor to pop up the camera, and controls a rotating motor to rotate the camera in a horizontal direction to +30°. The camera captures an image and pre-outputs the image.

Figure 13:
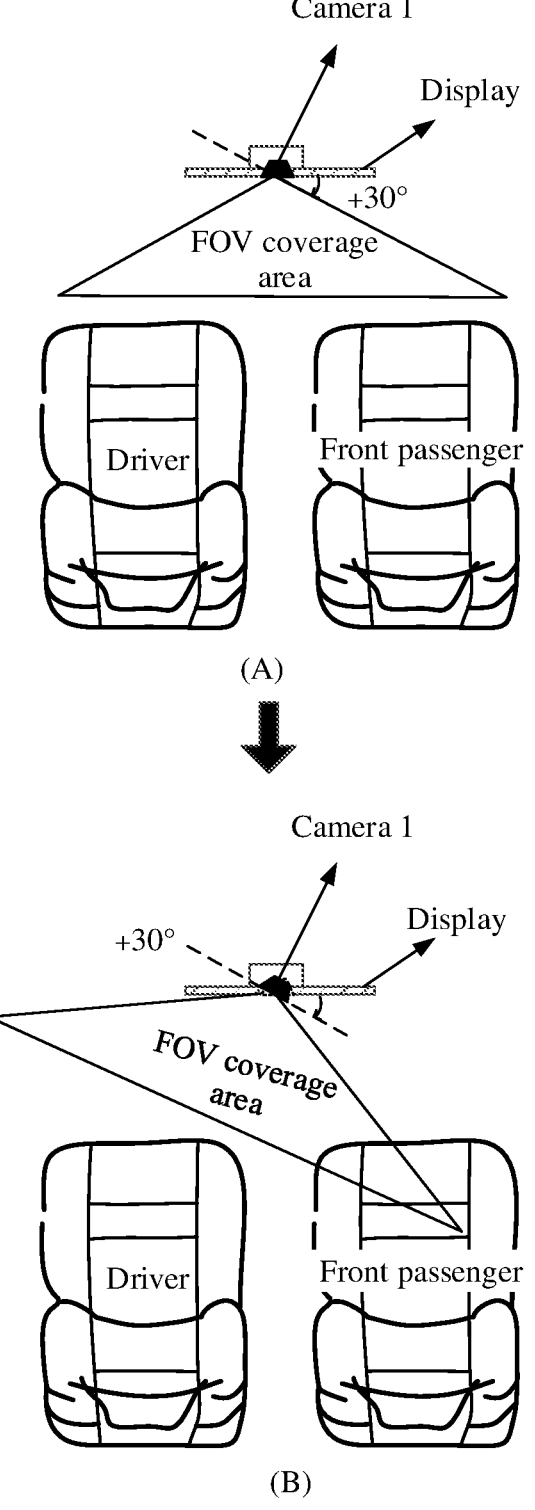
FIG. 13 is a schematic diagram of a field of view of a driver photographing mode according to an embodiment of this application.

For example, as shown in (A) in FIG. 13, when the camera 1 pops up at 0°, a field of view FOV coverage area of the camera 1 includes cockpit space of a driver position and a front passenger position. When the motor control chip controls the camera 1 to rotate clockwise to +30°, as shown in (B) in FIG. 13, a field of view (FOV) coverage area of the camera 1 mainly includes the driver position.

S5: After completing execution of the control signaling 5, the camera module transmits an image to the cockpit controller.

S6: The cockpit controller identifies whether the driver is in an optimal position in the image. If the driver is in the optimal position in the image, S7 is performed. If the driver is not in the optimal position in the image, S7 is performed.

The optimal position is a position at which the camera can take a front-centered image of the driver.

S7: The cockpit controller generates a position adjustment instruction, and delivers a position adjustment instruction to the motor control chip, where the position adjustment instruction is used to control the camera to adjust to the optimal position according to the instruction.

S8: After receiving the position adjustment instruction, the motor control chip in the camera module controls the rotating motor to adjust the camera 1 to the optimal position, and sends a state feedback to the cockpit controller. The state feedback is used to feed back that the camera completes execution of the position adjustment instruction.

There may be a plurality of implementations of the position adjustment instruction in S8. In one implementation, the position adjustment instruction may be controlling the camera to rotate by a first angle in a horizontal direction, so as to adjust the camera 1 to an optimal position. In another implementation, the position adjustment instruction may be controlling the camera to rotate by a second angle in a vertical direction, so as to adjust the camera 1 to an optimal position. In another manner, the position adjustment instruction may be controlling the camera 1 to rotate by a first angle in a horizontal direction and by a second angle in a vertical direction, so as to adjust the camera 1 to an optimal position. Herein, values of the first angle, the second angle, and the third angle are not limited, and are set according to an actual situation.

Figure 14:
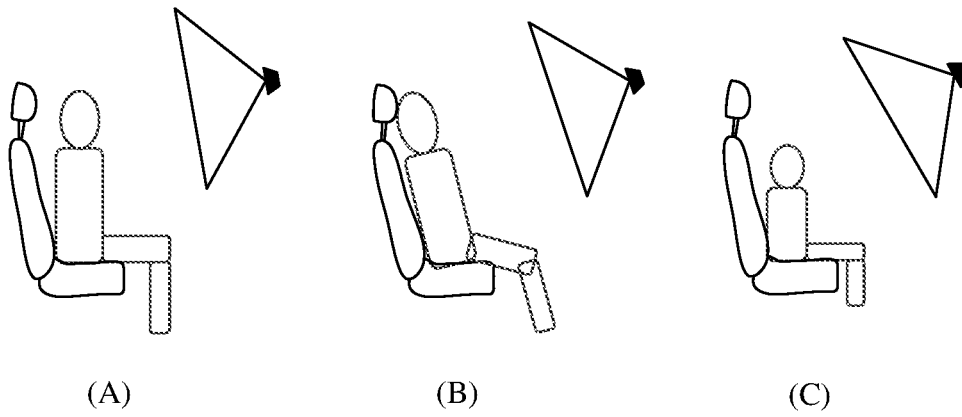
FIG. 14 is a schematic diagram of vertical angle adjustment according to an embodiment of this application.

How to adjust a vertical field of view (that is, the rotation angle in the vertical direction) of the first camera may be determined based on a state (for example, a height and/or a sitting posture) of the photographed object. Two photographed objects with a same height have different sitting postures and different rotation angles in the vertical direction. For example, a height of a photographed object 1 in (A) in FIG. 14 is the same as a height of a photographed object 2 in (B) in FIG. 14, but the photographed object 1 is in a sitting state, and the photographed object 2 is in a state leaning against a back of a seat. An angle at which the camera in (B) in FIG. 14 rotates downward in the vertical direction is greater than an angle at which the camera in (A) in FIG. 14 rotates downward in the vertical direction. However, two photographed objects with a same sitting posture have different heights and different rotation angles in the vertical direction. For example, a sitting posture of the photographed object 1 in (A) in FIG. 14 is the same as a sitting posture of a photographed object 3 in (C) in FIG. 14, but the height of the photographed object 1 is greater than the height of the photographed object 3. An angle at which the camera in (C) in FIG. 14 rotates downward in the vertical direction is greater than the angle at which the camera in (A) in FIG. 14 rotates downward in the vertical direction.

In the foregoing embodiment, when taking images or recording videos is performed on photographed objects of different heights and different sitting postures, a vertical field of view is adjusted with reference to a state of the photographed object, so that an optimal scenario of a multi-person photographing or a single-person photographing may be considered, and an optimal field of view may be obtained. For example, when a child is photographed, the camera can be adjusted to a child-friendly field of view for child-friendly images.

S9: The cockpit controller determines that the camera is adjusted to the optimal position. S10 continues to be performed.

S10: The cockpit controller outputs a voice information to a loudspeaker: The driver photographing mode is ready. Correspondingly, the loudspeaker receives the voice information, and outputs a voice: The driver photographing mode is ready. The cockpit controller may perform S12 with a delay of a period of time (for example, a delay of 2 s) starting from outputting voice information to the loudspeaker, so as to reserve time for the driver to prepare a photographing posture.

S11: The cockpit controller generates a photographing instruction, and delivers the photographing instruction to the camera module. The photographing instruction instructs the camera to photograph the driver.

S12: The camera executes the photographing instruction to obtain image data, and transmits the image data to the cockpit controller.

S13: The cockpit controller performs image processing on the received image data and stores the image data, and outputs a driver image to the vehicle-mounted display.

S14: The vehicle-mounted display displays the driver image.

Figure 15:
FIG. 15 is a schematic diagram of a driver image according to an embodiment of this application.

For example, FIG. 15 is a schematic diagram of a driver image photographed by a camera.

In the foregoing example, the cockpit controller controls the first camera to rotate to the optimal position, for example, to rotate to an angle within a range of +30° to +45°, to obtain a front-centered image of the driver. In this way, a photographing requirement of the diver position can be met, and a driver photograph at an optimal angle can be photographed.

In an implementation a4, the mode indicated by the instruction is the front passenger photographing mode, and the control signaling is used to control the first camera of the image shooting apparatus to: rotate to face a front passenger position of the vehicle and perform a photographing action on the front passenger position.

In the implementation a4, a related implementation in which the control apparatus generates the control signaling according to the instruction is similar to the implementation a4, and may refer to each other. Details are not described herein again.

Figure 16:
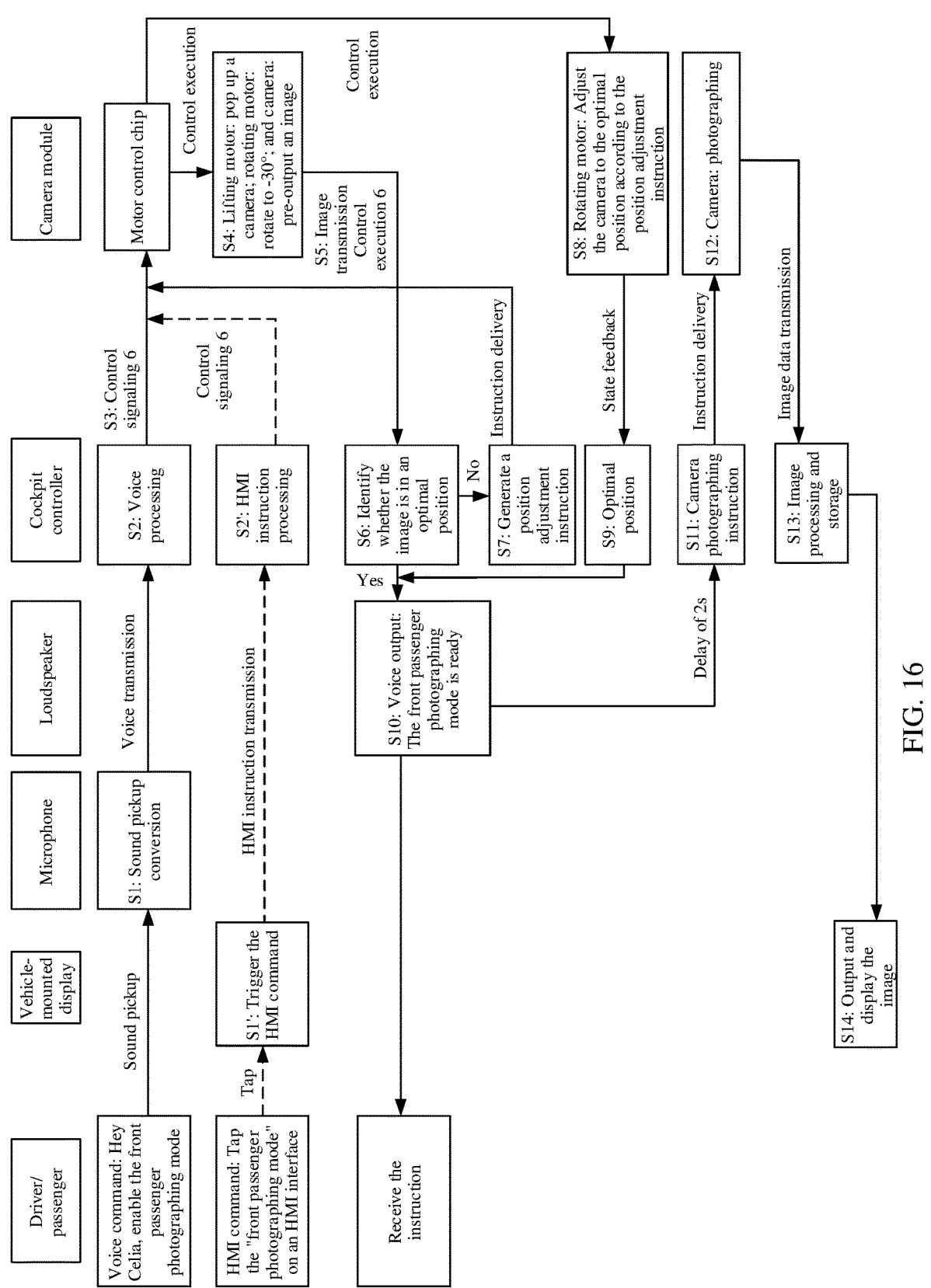
FIG. 16 is a schematic flowchart of a control method according to an embodiment of this application.

The following describes a schematic flowchart of a control method shown in FIG. 16 by using an example in which the control apparatus is a cockpit controller and with reference to a front passenger photographing mode.

As shown in FIG. 16, the method includes the following steps.

S1: A microphone array picks up sound, obtains a sound signal of a voice instruction, picks up and converts the sound signal into an electrical signal, and transmits the electrical signal to a cockpit controller.

For example, the voice instruction may be initiated by a driver or a passenger, and content of the voice instruction may be "Hey Celia, enable a front passenger photographing mode".

S2: After receiving the voice instruction, the cockpit controller processes the voice to generate control signaling 5. Then, S3 continues to be performed. The control signaling 6 is used to control the camera to pop up, and rotate the camera in a horizontal direction to a fourth preset angle, for example, −30° after the camera pops up.

In some other embodiments, the front passenger panoramic photographing mode may be enabled by using an instruction input on a user interface, and the foregoing S1 and S2 may be replaced with S1' and S2' respectively.

S1': A vehicle-mounted display detects a tap operation, triggers a human machine interface (HMI) instruction in response to the tap operation, and transmits the HMI instruction to the cockpit controller.

For example, the tap operation may be an operation that the driver or the passenger taps the "front passenger photographing mode" on an HMI interface.

S2': After receiving the HMI instruction, the cockpit controller processes the HMI instruction to generate control signaling 6. Then, S3 continues to be performed.

S3: The cockpit controller sends the control signaling 6 to a camera module.

S4: After receiving the control signaling 6, a motor control chip in the camera module controls a lifting motor to pop up the camera, and controls a rotating motor to rotate the camera in a horizontal direction to −30°. The camera captures an image and pre-outputs the image.

Figure 17:
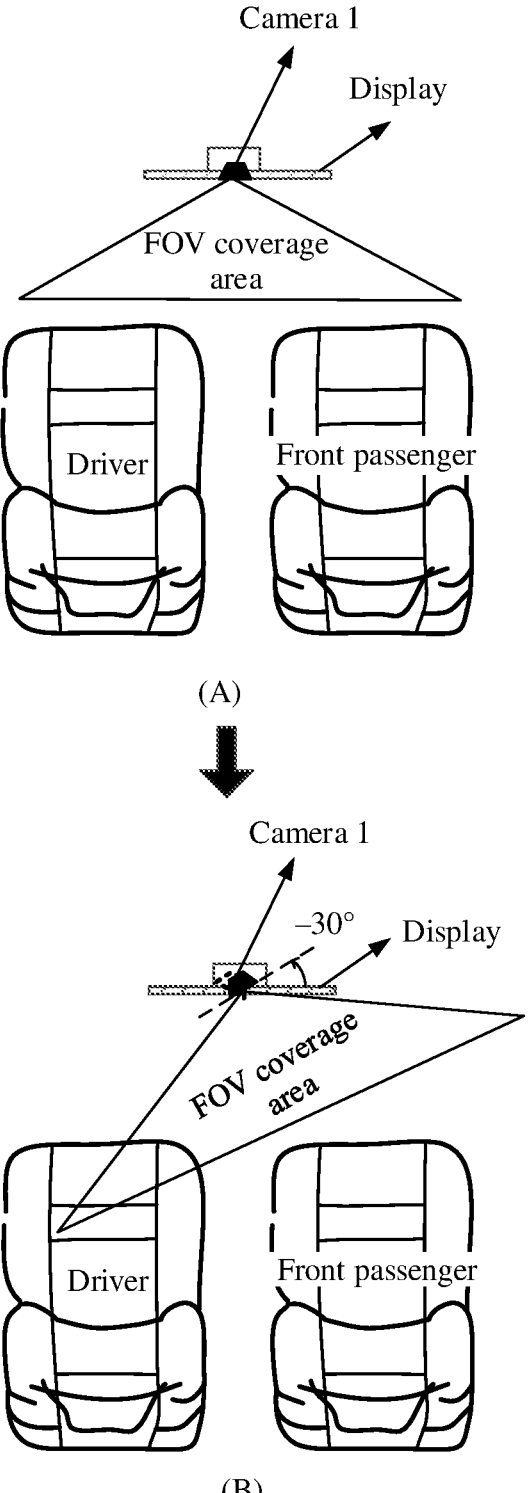
FIG. 17 is a schematic diagram of a field of view of a front passenger photographing mode according to an embodiment of this application.

For example, as shown in (A) in FIG. 17, when the camera 1 pops up at 0°, a field of view FOV coverage area of the camera 1 includes cockpit space of a driver position and a front passenger position. When the motor control chip controls the camera 1 to rotate counterclockwise to −30° in the horizontal direction, as shown in (B) in FIG. 17, the field of view FOV coverage area of the camera 1 mainly includes the front passenger position.

S5: After completing execution of the control signaling 6, the camera module transmits an image to the cockpit controller.

S6: The cockpit controller identifies whether the passenger in the front passenger position is located in the optimal position in the image. If the passenger in the front passenger position is located in the optimal position in the image, S7 is performed. If the passenger in the front passenger position is not located in the optimal position in the image, S7 is performed.

The optimal position is a position at which the camera can photograph a front-centered image of the passenger in the front passenger position.

S7: The cockpit controller generates a position adjustment instruction, and delivers a position adjustment instruction to the motor control chip, where the position adjustment instruction is used to control the camera to adjust to the optimal position according to the instruction.

S8: After receiving the position adjustment instruction, the motor control chip in the camera module controls the rotating motor to adjust the camera to the optimal position, and sends a state feedback to the cockpit controller. The state feedback is used to feed back that the camera completes execution of the position adjustment instruction.

Herein, for an implementation of the position adjustment instruction in S8, refer to related content of the position adjustment instruction in S8 in FIG. 12. Details are not described herein again.

S9: The cockpit controller determines that the camera is rotated to the optimal position. S10 continues to be performed.

S10: The cockpit controller outputs a voice information to a loudspeaker: The front passenger photographing mode is ready. Correspondingly, the loudspeaker receives the voice information, and outputs a voice: The front passenger photographing mode is ready. The cockpit controller may perform S12 with a delay of a period of time (for example, a delay of 2 s) starting from outputting voice information to the loudspeaker, so as to reserve time for the passenger in the front passenger position to prepare a photographing posture.

S11: The cockpit controller generates a photographing instruction, and delivers the photographing instruction to the camera module. The photographing instruction instructs the camera to photograph the passenger in the front passenger position.

S12: The camera executes the photographing instruction to obtain image data, and transmits the image data to the cockpit controller.

S13: The cockpit controller performs image processing on the received image data and stores the image data, and outputs a passenger image of the front passenger position to the vehicle-mounted display.

S14: The vehicle-mounted display displays the passenger image of the front passenger position.

Figure 18:
FIG. 18 is a schematic diagram of an image of a passenger in a front passenger position according to an embodiment of this application.

For example, FIG. 18 is a schematic diagram of a passenger image of a front passenger position that is photographed by a camera.

In the foregoing example, an angle of the first camera is adjustable, an FOV coverage area is wide, and the cockpit controller controls the first camera to rotate to the optimal position, for example, to rotate to an angle within a range of −30° to −45°, to obtain a front-centered image of a passenger in the front passenger position. In this way, a photographing requirement of the front passenger position can be met, and the passenger image of the front passenger position at the optimal angle can be photographed.

In an implementation a5, the mode indicated by the instruction is a video call mode. A position of a video call object is determined based on the video call mode indicated by the instruction, a seat state in the cockpit, sound information in the cockpit, and image information in the cockpit. The control signaling is generated based on the position of the video call object, where the control signaling is used to control a first camera to rotate to face the position of the video call object.

Figure 19:
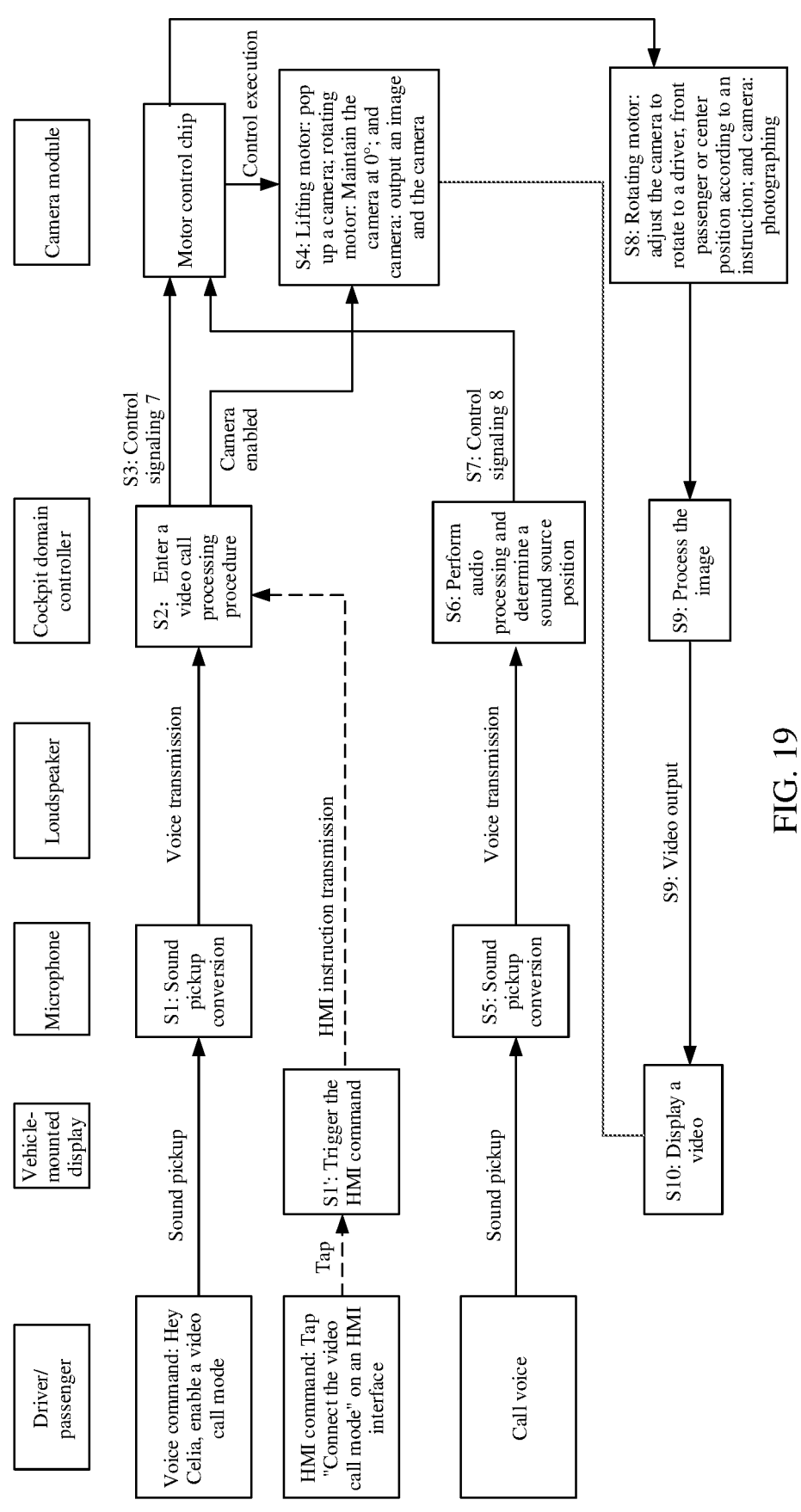
FIG. 19 is a schematic flowchart of a control method according to an embodiment of this application.

The following describes a schematic flowchart of a control method shown in FIG. 19 by using an example in which the control apparatus is a cockpit controller and with reference to a video call mode.

As shown in FIG. 19, the method includes the following steps.

S1: A microphone array picks up sound, obtains a sound signal of a voice instruction, picks up and converts the sound signal into an electrical signal, and transmits the electrical signal to a cockpit controller.

For example, the voice instruction may be initiated by a driver or a passenger, and content of the voice instruction may be "Hey Celia, enable a video call mode".

In some other embodiments, the video call mode in the cockpit may be enabled by using an instruction input on a user interface, and the foregoing S1 may be replaced with S1'.

S1': A vehicle-mounted display detects a tap operation, triggers a human machine interface (HMI) instruction in response to the tap operation, and transmits the HMI instruction to the cockpit controller.

For example, the tap operation may be an operation that the driver or the passenger taps the "video call mode" on the HMI interface.

S2: After receiving a voice instruction (or the HMI instruction), the cockpit controller enters a video call processing procedure.

S3: The cockpit controller controls the camera to be turned on, and sends control signaling 7 to a motor control chip. The control signaling 7 is used to control the camera to pop up and maintain the camera at 0° after the camera pops up. Herein, an angle when a lens of the camera is parallel to a plane on which a display is located may be defined as 0°.

S4: After receiving the control signaling 7, the motor control chip in the camera module controls a lifting motor to pop up the camera, and controls a rotating motor to maintain the camera at and the camera captures and outputs an image. Then S10 is performed.

After the camera is turned on, it may be determined, based on a seat state in the cockpit, whether there is a person in the driver position and the front passenger position. If there is a person in the driver position, the camera is adjusted to align with the driver position. If there is a person in the front passenger position, the camera is adjusted to the front passenger position. If there are people in the driver position and the front passenger position, it may be determined by using a microphone whether the person in the driver position or the front passenger position is talking. If only the person in the driver position is talking, the camera is adjusted to be aligned with the driver position. If only the person in the front passenger position is talking, the camera is adjusted to the front passenger position. If it is determined, by using the microphone, that both the person in the driver position and the person in the front passenger position are talking through a video call, the camera is adjusted to a center position, so that both the person in the driver position and the person in the front passenger position are within a field of view coverage area of the camera, or dual cameras are enabled to aim at the person in the driver position and the front passenger position respectively, and display images at the same time. For an implementation, refer to S5 to S10.

S5: The microphone picks up sound to obtain a sound signal of a call voice, picks up and converts the sound signal into an electrical signal, and transmits the electrical signal to a cockpit controller.

S6: The cockpit controller processes the audio and determines a sound source position.

S7: After the sound source position is determined, control signaling 8 may be delivered to the motor control chip, where the control signaling 8 is used to control the camera to rotate to face the sound source position and execute a photographing command. The sound source position includes a driver, a passenger, or a center position.

For example, if the cockpit controller determines that the sound source position is the driver position, the control signaling 8 is used to control the camera to rotate to face the driver position. As shown in (B) in FIG. 13, when the motor control chip controls the camera 1 to rotate clockwise to +30° in the horizontal direction, the camera 1 is aligned with the driver position and executes the photographing command. If the cockpit controller determines that the sound source position is the front passenger position, the control signaling 8 is used to control the camera to rotate to face the front passenger position, and execute the photographing command. As shown in (B) in FIG. 16, when the motor control chip controls the camera 1 to rotate counterclockwise to −30° in the horizontal direction, the camera 1 is aligned with the front passenger position. If the cockpit controller determines that the sound source position is the driver position and the front passenger position, the control signaling 8 is configured to control the camera to rotate in the horizontal direction to a center position, and execute the photographing command, where the center position is a position between the driver position and the front passenger position, as shown in (A) in FIG. 17. The camera 1 is in the center position, that is, 0°, and the field of view FOV coverage area of the camera 1 is aligned with a position that is located in a middle of the driver position and the front passenger position.

S8: The cockpit controller controls the rotating motor to rotate to face the sound source position according to the control signaling 8, executes the photographing command, and sends video data to the cockpit controller.

S9: The cockpit controller processes the video data, and outputs a video to the vehicle-mounted display.

S10: The vehicle-mounted display displays the video.

In the example of the video call mode shown in FIG. 19, an example in which a rotation feature of the camera in the horizontal direction is used is used for description. In some other embodiments, the video call may alternatively be implemented by using the rotation feature of the camera in the vertical direction.

In the foregoing example, the cockpit controller determines, by using a microphone array, a position at which a call voice instruction is sent, and controls the camera to rotate to an angle of a position of a call voice sender, so as to display the call voice sender (for example, a passenger in a driver position or a front passenger position) at an optimal angle in a video. A position of a video call object can be automatically identified based on a rotation feature of a first camera, to meet a video call requirement of the driver or the passenger.

In an implementation a6, a mode indicated by the instruction is a dual-camera video mode, where the dual-camera video mode may be a dual-camera live broadcast mode, or may be a dual-camera recorded broadcast mode. The control apparatus may determine a type of the dual-camera video mode based on the dual-camera video mode indicated by the instruction and a running state of a vehicle in which the cockpit is located; and generate the control instruction based on the type of the dual-camera video mode.

Generating the control instruction based on the type of the dual-camera video mode may include any one of the following several manners.

Manner 1: The type of the dual-camera video mode is a driver mode, and the control signaling is used to control the first camera of the image shooting apparatus to: rotate to a first field of view to face the driver position and perform video capture of the driver position, and is used to:

control a second camera of the image shooting apparatus to: rotate to face space outside the vehicle and perform video capture on the space outside the vehicle, or control a second camera of the image shooting apparatus to: rotate to a second field of view to face the driver position and perform video capture on the driver position. In the manner 1, a wide FOV coverage area of the camera can meet a requirement for synchronous photographing of front and rear views, and can provide an optimal video angle, and an angle can be customized.

Manner 2: A type of the dual-camera video mode is a front passenger mode, and the control signaling is used to control the first camera of the image shooting apparatus to: rotate to a first field of view to face the front passenger position and perform video capture of the front passenger position, and is used to:

control a second camera of the image shooting apparatus to: rotate to face space outside the vehicle and perform video capture on the space outside the vehicle, or control a second camera of the image shooting apparatus to: rotate to a second field of view to face the front passenger position and perform video capture on the front passenger position. In the manner 2, a wide FOV coverage area of the camera can meet synchronous photographing of front and rear views, and can provide an optimal video angle, and an angle can be customized.

Manner 3: the type of the dual-camera video mode is a two-person mode, and the control signaling is used to: control a first camera of the image shooting apparatus to rotate to face a driver position and perform video capture on the driver position, and control a second camera of the image shooting apparatus to: rotate to face a front passenger position and perform video capture on the front passenger position. In mode 3, a wide FOV coverage area of the camera can provide an optimal video angle for the driver position and the front passenger position, and the angle can be customized.

In an implementation a6, when controlling the image shooting apparatus to face the photographed object, the control apparatus may rotate the camera in a horizontal direction and/or in a vertical direction, so as to photograph the photographed object at the optimal angle.

Figure 20:
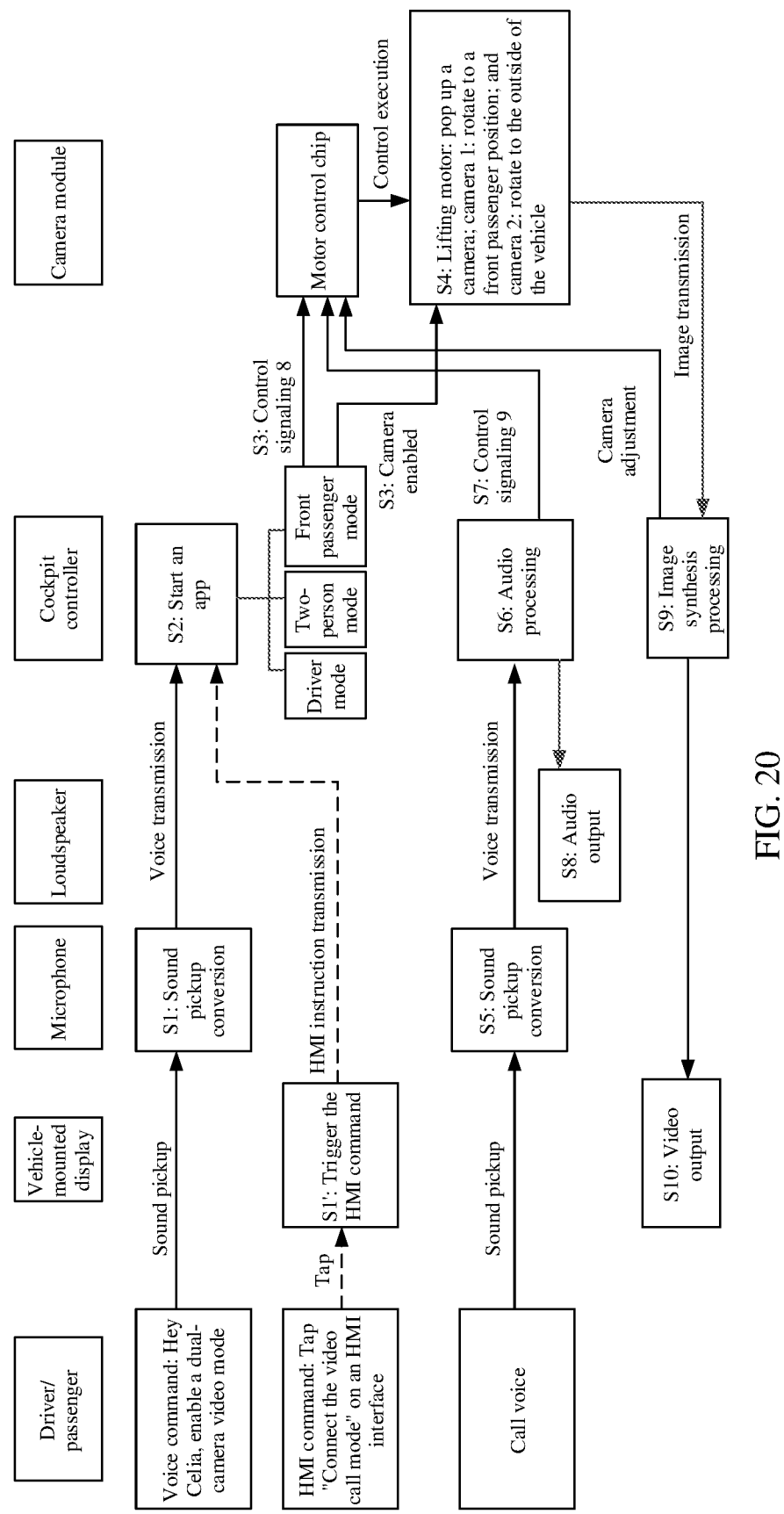
FIG. 20 is a schematic flowchart of a control method according to an embodiment of this application.

The following describes a schematic flowchart of a control method shown in FIG. 20 by using an example in which the control apparatus is a cockpit controller and with reference to a dual-camera video mode.

As shown in FIG. 20, the method includes the following steps.

S1: A microphone array picks up sound, obtains a sound signal of a voice instruction, picks up and converts the sound signal into an electrical signal, and transmits the electrical signal to a cockpit controller.

For example, the voice instruction may be initiated by a driver or a passenger, and content of the voice instruction may be "Hey Celia, enable a dual-camera video mode".

In some other embodiments, the video call mode in the cockpit may be enabled by using an instruction input on a user interface, and the foregoing S1 may be replaced with S1'.

S1': A vehicle-mounted display detects a tap operation, triggers a human machine interface (HMI) instruction in response to the tap operation, and transmits the HMI instruction to the cockpit controller.

For example, the tap operation may be an operation that the driver or the passenger taps the "dual-camera video mode" on the HMI interface.

S2: After receiving the voice instruction (or the HMI instruction), the cockpit controller starts an app.

Herein, the app is an app that can perform live broadcast or recorded broadcast.

In an embodiment, the cockpit controller may determine, with reference to the voice instruction or the HMI instruction, that the dual-camera video mode is a driver mode, a front passenger mode, or a two-person mode; or may determine, with reference to the voice instruction, the HMI instruction, and a running state of the vehicle, that the dual-camera video mode is a driver mode, a front passenger mode, or a two-person mode.

For example, if determining that the vehicle is running and an automatic driving mode is not enabled, the cockpit controller determines to enable the front passenger mode. If determining that the automatic driving mode is enabled and no one is in the front passenger position, the cockpit controller determines to enable the driver mode. If determining that the automatic driving mode is enabled and there is a person in the front passenger position, the cockpit controller determines to enable the two-person mode.

The following describes a subsequent process by using enabling the front passenger mode as an example.

S3: The cockpit controller controls the camera to be turned on, and sends control signaling 8 to the motor control chip. The control signaling 8 is used to control the camera to pop up, control the camera 1 to rotate in a horizontal direction to align with the front passenger position, and control the camera 2 to rotate in a horizontal direction to align with the outside of the vehicle.

S4: After receiving the control signaling 8, the motor control chip in the camera module controls a lifting motor to pop up the camera, and controls a rotating motor to pop up the camera 1 in the horizontal direction to align with the front passenger position, and rotate the camera 2 in the horizontal direction to align with the outside of the vehicle; and the camera captures and outputs images. Then, step S8 is performed.

Figure 21:
FIG. 21 is a schematic diagram of a field of view of a front passenger mode according to an embodiment of this application.
Figure 21:
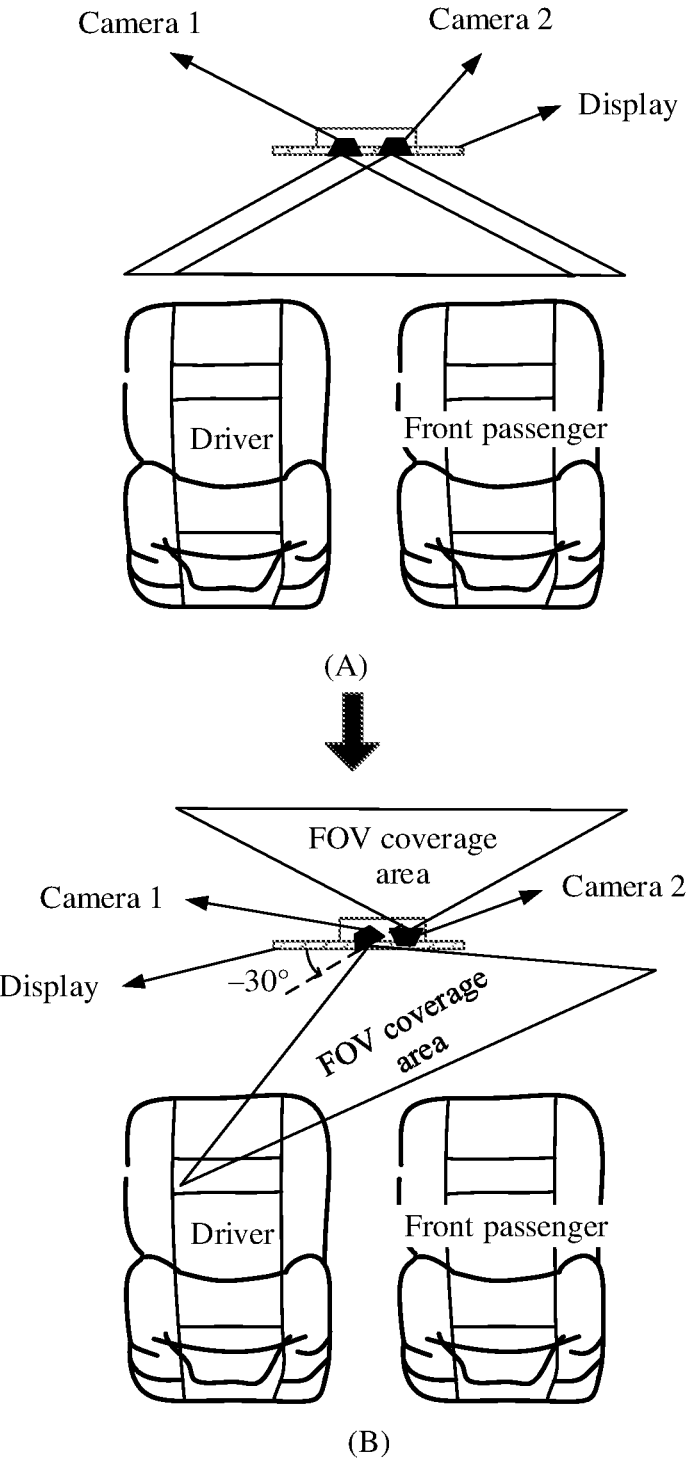

For example, as shown in (A) in FIG. 21, the camera 1 and the camera 2 pop up at 0°, and field of view FOV coverage areas of the camera 1 and the camera 2 are the same, including the cockpit space in the driver position and the front passenger position. After the motor control chip receives the control signaling 8, as shown in (B) in FIG. 21, when the motor control chip controls the camera 1 to rotate counterclockwise to −30° in the horizontal direction, the camera 1 is aligned with the front passenger position. When the motor control chip controls the camera 2 to rotate counterclockwise to −180° in the horizontal direction, the camera 2 is aligned directly in front of the vehicle. It should be understood that a direction in which the camera 2 is aligned may be any direction outside the vehicle, and a field of view of the camera 2 may be switched at any time. Values of rotation angles of the camera 1 and the camera 2 are not limited in this application.

In a live broadcast or recorded broadcast process, a camera alignment position may be further adjusted by using a user voice instruction. For a process, refer to S5 and S6.

S5: The microphone picks up sound to obtain a sound signal of a call voice, picks up and converts the sound signal into an electrical signal, and transmits the electrical signal to a cockpit controller.

S6: The cockpit controller processes the audio, and identifies whether to adjust the camera position. If the camera position is adjusted, S7 is performed. If the camera position is not adjusted, S8 is performed.

S7: After it is determined that the camera position needs to be adjusted, control signaling 9 may be delivered to the motor control chip, where the control signaling 9 is used to control the camera to rotate to a specified adjustment position and execute a photographing command. Then, S9 continues to be performed.

S8: The cockpit controller inputs a voice.

S9: The cockpit controller performs synthesis processing on the image data, and outputs a video to the vehicle-mounted display.

S10: The vehicle-mounted display displays the video.

For example, the vehicle-mounted display may display a video recorded by one camera, or may simultaneously display a video recorded by the two cameras.

In that foregoing example, the cockpit controller may invoke dual cameras, invoke one camera to rotate in the horizontal direction to an optimal position aligned with an anchor (for example, the passenger in the front passenger position), and invoke the other camera to rotate in the horizontal direction to a position outside the vehicle, to live or record an anchor video to audiences and a video along the way during vehicle driving.

In addition, control method procedures corresponding to the driver mode and the two-person mode in the dual-camera video mode are similar to that in the front passenger mode, and may refer to each other. Details are not described herein again. The driver mode, the two-person mode, and the front passenger mode are different in rotation angles of the dual cameras, which are described below.

Figure 22:
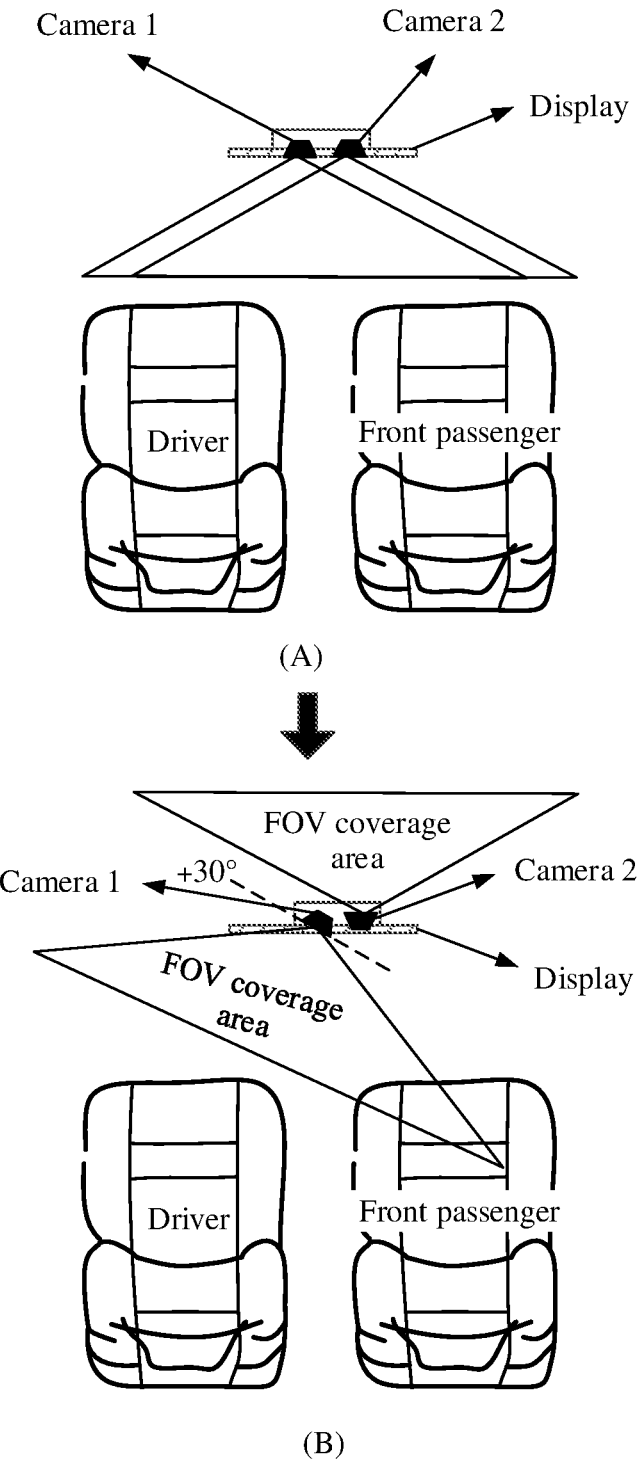
FIG. 22 is a schematic diagram of a field of view of a driver mode according to an embodiment of this application.

The following describes the driver mode with reference to FIG. 22.

For example, as shown in (A) in FIG. 22, the camera 1 and the camera 2 pop up at 0°, and field of view FOV coverage areas of a camera 1 and a camera 2 are the same, including cockpit space in the driver position and the front passenger position. After the motor control chip receives the control signaling, as shown in (B) in FIG. 22, when the motor control chip controls the camera 1 to rotate clockwise to +30° in a horizontal direction, the camera 1 is aligned with the driver position. When the motor control chip controls the camera 2 to rotate counterclockwise to −180° in the horizontal direction, the camera 2 is aligned directly in front of the vehicle. It should be understood that a direction in which the camera 2 is aligned may be any direction outside the vehicle, and a field of view of the camera 2 may be switched at any time. Values of rotation angles of the camera 1 and the camera 2 are not limited in this application.

Figure 23:
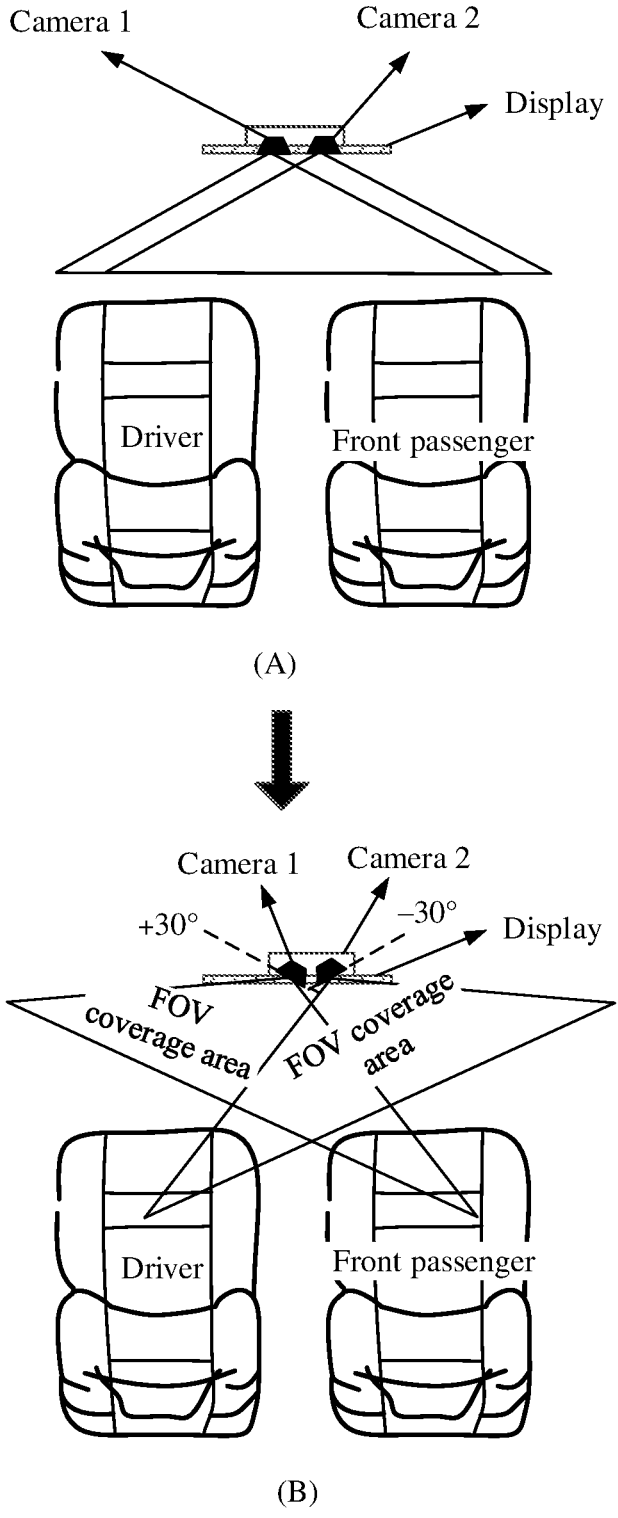
FIG. 23 is a schematic diagram of a field of view of a two-person mode according to an embodiment of this application.

The following describes the two-person mode with reference to FIG. 23.

For example, as shown in (A) in FIG. 23, the camera 1 and the camera 2 pop up at 0°, and field of view FOV coverage areas of the camera 1 and the camera 2 are the same, including cockpit space of the driver position and the front passenger position. After the motor control chip receives the control signaling, as shown in (B) in FIG. 23, when the motor control chip controls the camera 1 to rotate clockwise to +30° in the horizontal direction, the camera 1 is aligned with the driver position. When the motor control chip controls the camera 2 to rotate counterclockwise to −30° in the horizontal direction, the camera 2 is aligned with the front passenger position. It should be understood that values of rotation angles of the camera 1 and the camera 2 are not limited in this application.

In some other embodiments, the dual cameras may alternatively face a same object. The front passenger mode is used as an example. The camera 1 and the camera 2 face different fields of view of the passenger in the front passenger position, for example, the camera 1 faces the front of the passenger in the front passenger position. The camera 2 faces a side of the passenger in the front passenger position, so that a recorded or live broadcast object can be displayed from a plurality of angles.

In an implementation a7, the mode indicated by the instruction is a privacy mode. The control signaling is used to control the image shooting apparatus to retract all cameras included in the image shooting apparatus.

Figure 24:
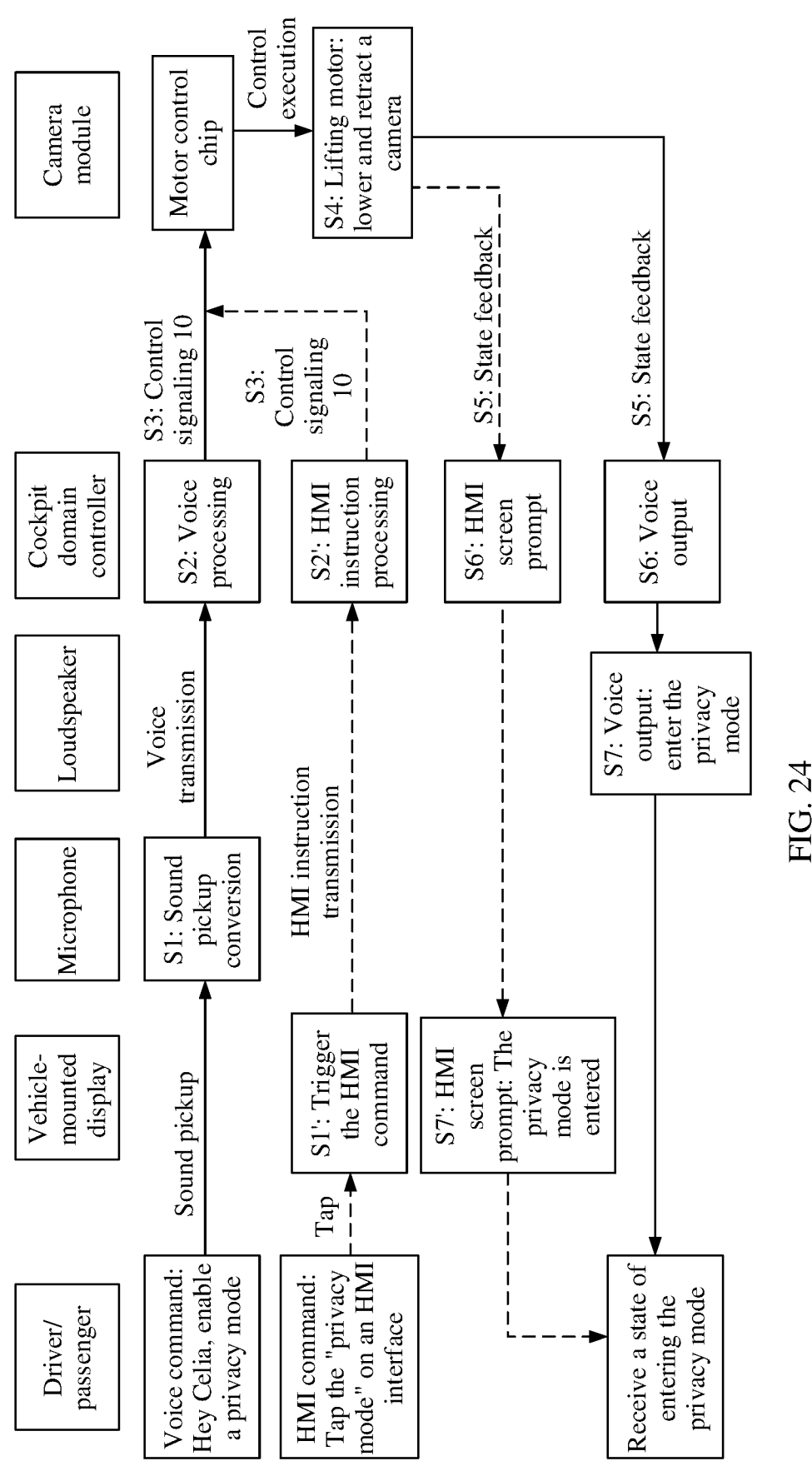
FIG. 24 is a schematic flowchart of a control method according to an embodiment of this application.

The following describes a schematic flowchart of a control method shown in FIG. 24 by using an example in which the control apparatus is the cockpit controller and with reference to the privacy mode.

As shown in FIG. 24, the method includes the following steps.

S1: A microphone array picks up sound, obtains a sound signal of a voice instruction, picks up and converts the sound signal into an electrical signal, and transmits the electrical signal to a cockpit controller.

For example, the voice instruction may be initiated by a driver or a passenger, and content of the voice instruction may be "Hey Celia, enable a privacy mode".

S2: After receiving the voice instruction, the cockpit controller processes the voice to generate control signaling 10. Then, S3 continues to be performed. The control signaling 10 is used to control the camera to lower and retract.

In some other embodiments, the panoramic photographing mode in the cockpit may be enabled by using an instruction input on a user interface, and the foregoing S1 and S2 may be replaced with S1' and S2' respectively.

S1': A vehicle-mounted display detects a tap operation, triggers a human machine interface (HMI) instruction in response to the tap operation, and transmits the HMI instruction to the cockpit controller.

For example, the tap operation may be an operation that the driver or the passenger taps the "privacy mode" on the HMI interface.

S2': After receiving the HMI instruction, the cockpit controller processes the HMI instruction to generate control signaling 10. Then, S3 continues to be performed.

S3: The cockpit controller sends the control signaling 10 to a camera module.

S4: After receiving the control signaling 10, the motor control chip in the camera module controls the lifting motor to lower and retract the camera.

S5: After completing execution of the control signaling 10, the camera module sends a state feedback to the cockpit controller, where the state feedback indicates that the camera is lowered and retracted.

S6: The cockpit controller generates voice information, and outputs the voice information to a loudspeaker, where the voice information may include "Enter the privacy mode".

S7: The loudspeaker receives the voice information, and outputs a voice: Enter the privacy mode.

In some other embodiments, the vehicle-mounted display may further prompt the user to enter the privacy mode. For a process, refer to the foregoing S6 and S7, which may be replaced with S6' and S7' respectively.

S6': The cockpit controller sends HMI prompt information to the vehicle-mounted display, where the HMI prompt information includes "Enter the privacy mode".

S7': The vehicle-mounted display displays the HMI prompt information: Enter the privacy mode.

By using the foregoing example, after the driver or the passenger enables the privacy mode, the cockpit controller controls the camera to lower and retract a lens, and no image capture is performed. In this way, privacy of the driver or the passenger can be protected, and the driver or the passenger can be relaxed.

In some other embodiments, the privacy mode may be enabled according to whether a vehicle model is set to be enabled. For example, a family vehicle may be set to be enabled, or may be set to be disabled. A pop-up camera may pop up when a user needs to use the pop-up camera, and may be lowered and retracted when the user does not need to use the pop-up camera. For another example, a commercial vehicle such as a bus or a work vehicle generally has a mandatory requirement on surveillance. Therefore, the privacy mode may be not allowed to be enabled.

Based on any one of the foregoing embodiments, the image shooting apparatus may further include a third camera, where the third camera remains in a pop-up state after the vehicle is started, and performs video capture towards space outside the vehicle.

Figure 25:
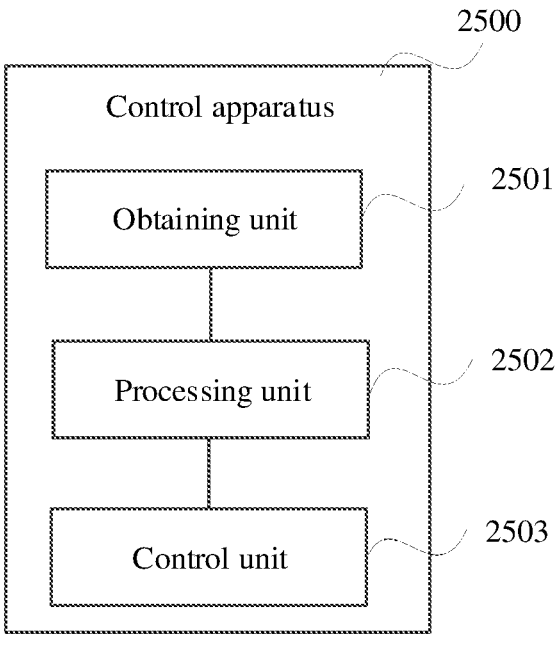
FIG. 25 is a schematic diagram of a control apparatus according to an embodiment of this application.

Based on the foregoing embodiments and a same concept, FIG. 25 is a schematic diagram of a control apparatus according to an embodiment of this application. As shown in FIG. 25, the control apparatus 2500 is configured to control an image shooting apparatus, and the image shooting apparatus includes one camera or at least two cameras. The control apparatus 2500 may implement steps performed by the control apparatus in the foregoing method embodiment. The control apparatus may include an obtaining unit 2501, a processing unit 2502, and a control unit 2503.

The obtaining unit 2501 is configured to obtain an instruction and/or cockpit information.

The processing unit 2502 is configured to generate control signaling according to the instruction and/or the obtained cockpit information.

The control unit 2503 is configured to control a space state of at least one camera of the image shooting apparatus in a cockpit by using the control signaling.

In an implementation, the space state includes an angle, a position, or an angle and a position.

In an implementation, the instruction includes any one of the following: a voice instruction, an instruction obtained by processing the voice instruction, an instruction input on a user interface, an instruction obtained by processing the instruction input on the user interface, and a received signal.

In an implementation, the instruction indicates a mode, and the mode includes: a panoramic photographing mode in a cockpit, a panoramic photographing mode outside a vehicle, a driver photographing mode, a front passenger photographing mode, a privacy mode, a video call mode, or a dual-camera video mode.

In an implementation, the cockpit information includes sound information in the cockpit, image information in the cockpit, a seat state in the cockpit, and a running state of a vehicle in which the cockpit is located.

In an implementation, the mode indicated by the instruction is the panoramic photographing mode in the cockpit, and the control signaling is used to control a first camera of the image shooting control apparatus to: rotate within a first preset angle range and perform panoramic scanning on space inside the cockpit.

In an implementation, the mode indicated by the instruction is the panoramic photographing mode outside the vehicle, and the control signaling is used to control a first camera of the image shooting control apparatus to: rotate within a second preset angle range and perform panoramic scanning on space outside the vehicle.

In an implementation, the mode indicated by the instruction is the driver photographing mode, and the control signaling is used to control a first camera of the image shooting control apparatus to: rotate to face a driver position of a vehicle and perform a photographing action on the driver position.

In an implementation, the mode indicated by the instruction is the front passenger photographing mode, and the control signaling is used to control a first camera of the image shooting control apparatus to: rotate to face a front passenger position of a vehicle and perform a photographing action on the front passenger position.

In an implementation, the mode indicated by the instruction is the video call mode. The processing unit 2502 is configured to: determine a position of a video call object based on the video call mode indicated by the instruction, a seat state in the cockpit, sound information in the cockpit, and image information in the cockpit; and generate the control signaling based on the position of the video call object, where the control signaling is used to control a first camera to rotate to face the position of the video call object.

In an implementation, the mode indicated by the instruction is the dual-camera video mode. The processing unit 2502 is configured to determine a type of the dual-camera video mode based on the dual-camera video mode indicated by the instruction and a running state of a vehicle in which the cockpit is located; and generate the control instruction based on the type of the dual-camera video mode.

The type of the dual-camera video mode is a driver mode, and the control signaling is used to control a first camera of the image shooting control apparatus to: rotate to a first field of view to face a driver position and perform video capture on the driver position, and is used to control a second camera of the image shooting control apparatus to: rotate to face space outside the vehicle and perform video capture on the space outside the vehicle, or control a second camera of the image shooting control apparatus to: rotate to a second field of view to face the driver position and perform video capture on the driver position.

Alternatively, the type of the dual-camera video mode is a front passenger mode, and the control signaling is used to control a first camera of the image shooting control apparatus to: rotate to a first field of view to face a front passenger position, and perform video capture on the front passenger position, and is used to control a second camera of the image shooting control apparatus to: rotate to face space outside the vehicle and perform video capture on the space outside the vehicle, or control a second camera of the image shooting control apparatus to: rotate to a second field of view to face the front passenger position and perform video capture on the front passenger position.

Alternatively, the type of the dual-camera video mode is a two-person mode, and the control signaling is used to control a first camera of the image shooting control apparatus to: rotate to face a driver position and perform video capture on the driver position, and control a second camera of the image shooting control apparatus to: rotate to face a front passenger position and perform video capture on the front passenger position.

In an implementation, the mode indicated by the instruction is the privacy mode, and the control signaling is used to control the image shooting control apparatus to retract all cameras included in the image shooting control apparatus.

In an implementation, the image shooting control apparatus further includes a third camera, and the third camera remains in a pop-up state after the vehicle is started, and performs video capture on the space outside the vehicle.

For concepts, explanations, detailed descriptions, and other steps of the control apparatus that are related to the technical solutions provided in embodiments of this application, refer to the descriptions of the content in the foregoing methods or other embodiments. Details are not described herein again.

Figure 26:
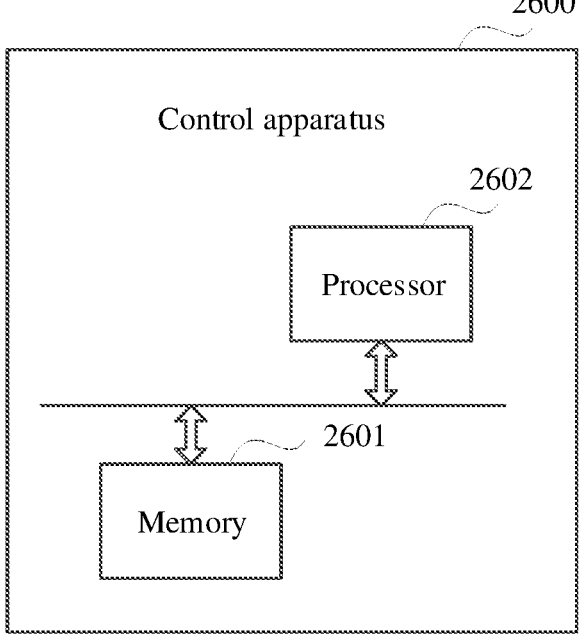
FIG. 26 is a schematic diagram of a control apparatus according to an embodiment of this application.

According to the foregoing method, FIG. 26 is a schematic diagram of a structure of a control apparatus according to an embodiment of this application. As shown in FIG. 26, the communication apparatus 2600 may include a memory 2601 and a processor 2602, and may further include a bus system. The processor 2602 and the memory 2601 may be connected by using a bus system.

It should be understood that the processor 2602 may be a chip. For example, the processor 2602 may be a field programmable gate array (FPGA), an application-specific integrated circuit (ASIC), a system on chip (SoC), a central processing unit (CPU), a network processor (NP), a digital signal processor (DSP), a micro controller (MCU), a programmable logic device (PLD), or another integrated chip.

In an implementation process, the steps of the foregoing method may be completed by using an integrated logic circuit of hardware in the processor 2602 or an instruction in a form of software. The steps of the method disclosed with reference to embodiments of this application may be directly performed by a hardware processor, or may be performed by using a combination of hardware in the processor 2602 and a software module. A software module may be located in a mature storage medium in the art, such as a random access memory, a flash memory, a read-only memory, a programmable read-only memory, an electrically erasable programmable memory, or a register. The storage medium is located in the memory 2601. The processor 2602 reads information in the memory 2601, and completes the steps of the foregoing method in combination with hardware of the processor 2602.

It should be noted that, the processor 2602 in embodiments of this application may be an integrated circuit chip, and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly performed and accomplished through a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory 2601 in this embodiment of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another proper type.

An embodiment of this application further provides a multimedia apparatus, including a control apparatus and an image shooting apparatus that are configured to perform the foregoing method. The image shooting apparatus includes at least two cameras; the control apparatus is configured to control the image shooting apparatus.

In an implementation, the multimedia apparatus further includes a screen component.

In an implementation, the image shooting apparatus is disposed on the screen component.

In an implementation, the control apparatus is disposed in the screen component; or the control apparatus is disposed in a cockpit controller and is connected to the screen component.

An embodiment of this application further provides a cockpit/vehicle, including a cockpit controller and a cockpit display component. The cockpit controller or the cockpit display component includes a control apparatus configured to perform the foregoing method.

According to the methods provided in embodiments of this application, this application further provides a computer program product. The computer program product includes computer program code or instructions. When the computer program code or the instructions is/are run on a computer, the computer is enabled to perform the method in any one of the foregoing method embodiments.

According to the method provided in embodiments of this application, this application further provides a computer-readable storage medium. The computer-readable medium stores program code. When the program code is run on a computer, the computer is enabled to perform the method in any one of the method embodiments.

According to the method provided in the embodiments of this application, this application further provides a chip system. The chip system may include a processor. The processor is coupled to the memory, and may be configured to perform the method in any one of the foregoing method embodiments. Optionally, the chip system further includes a memory. The memory is configured to store a computer program (which may also be referred to as code or instructions). The processor is configured to invoke a computer program from the memory and run the computer program, so that the device on which the chip system is installed performs the method in any one of the foregoing method embodiments.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer instructions are loaded and executed on a computer, the procedure or functions according to embodiments of this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state drive (SSD)), or the like.

It should be noted that a part of this patent application document includes copyright-protected content. The copyright owner reserves the copyright except copies are made for the patent documents or the recorded content of the patent documents in the Patent Office.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the internet interacting with other systems by using the signal).

A person of ordinary skill in the art may be aware that, in combination with illustrative logical blocks described in embodiments disclosed in this specification and steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer or a server) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A control method for controlling an image shooting apparatus comprising at least two cameras mounted inside a cockpit of a vehicle, the method comprising:
    obtaining, by a control apparatus, an instruction,
        wherein the instruction indicates one of several modes for operating the at least two cameras selected by a user of the image shooting apparatus,
        wherein the several modes include a panoramic photographing mode inside the cockpit of the vehicle, a panoramic photographing mode outside the vehicle, a driver photographing mode, a front passenger photographing mode, a privacy mode a video call mode, or a dual-camera video mode,
        wherein the control apparatus is configured to implement each of the several modes according to the instruction, and
        wherein the instruction is based on information provided by the user and instructs the control apparatus to enable the privacy mode;
    generating, by the control apparatus, control signaling to enable the privacy mode;
    controlling, by the control apparatus, by using the control signaling, a space state of at least one camera of the at least two cameras comprising the image shooting apparatus based on the privacy mode indicated by the instruction, and
        wherein the control signaling controls the image shooting apparatus to power off and retract the at least two cameras in response to the instruction indicating the privacy mode; and
    generating, by the control apparatus, visual and/or audible confirmation to the user that the privacy mode is enabled.

2. The method according to claim 1, wherein the space state comprises an angle, a position, or the angle and the position.

3. The method according to claim 1, wherein the instruction comprises any one of: a voice instruction, an instruction obtained by processing the voice instruction, an instruction input on a user interface, an instruction obtained by processing the instruction input on the user interface, or a received signal.

4. The method according to claim 1, wherein the control controller also receives cockpit information comprising one or more of sound information in the cockpit, image information in the cockpit, a seat state in the cockpit, and a running state of the vehicle in which the cockpit is located.

5. The method according to claim 1, wherein the panoramic photographing mode in the cockpit controls a first camera of the at least two cameras to rotate within a first preset angle range and perform panoramic scanning on space inside the cockpit.

6. The method according to claim 1, wherein the panoramic photographing mode outside the vehicle controls a first camera of the at least two cameras to rotate within a second preset angle range and perform panoramic scanning on space outside the vehicle.

7. The method according to claim 1, wherein the driver photographing mode controls a first camera of the at least two cameras to rotate to face a driver position of the vehicle and perform a photographing action on the driver position.

8. The method according to claim 1, wherein the front passenger photographing mode controls a first camera of the at least two cameras to rotate to face a front passenger position of the vehicle and perform a photographing action on the front passenger position.

9. The method according to claim 1, wherein the video call mode causes the control apparatus to determine a position of a video call object, a seat state in the cockpit, sound information in the cockpit, and image information in the cockpit and generate control signaling based on the position of the video call object, wherein the control signaling controls a first camera to rotate to face the position of the video call object.

10. The method according to claim 1, wherein the dual-camera video mode causes the control apparatus to determine a type of the dual-camera video mode and a running state of the vehicle in which the cockpit is located and generate the control signaling based on the type of the dual-camera video mode, wherein the type of the dual-camera video mode is a driver mode,
    i. wherein the control signaling controls a first camera of the image shooting apparatus to rotate to a first field of view to face a driver position and perform video capture on the driver position, and
    ii. wherein the control signaling controls a second camera of the at least two cameras to rotate to face space outside the vehicle and perform video capture on the space outside the vehicle, or control the second camera of the at least two cameras to rotate to a second field of view to face the driver position and perform video capture on the driver position; or
wherein the type of the dual-camera video mode is a front passenger mode,
    i. wherein the control signaling controls the first camera of the image shooting apparatus to rotate to a first field of view to face a front passenger position and perform video capture on the front passenger position, and
    ii. wherein the control signaling controls the second camera of the image shooting apparatus to rotate to face space outside the vehicle and perform video capture on the space outside the vehicle, or control the second camera of the image shooting apparatus to rotate to a second field of view to face the front passenger position and perform video capture on the front passenger position; or
wherein the type of the dual-camera video mode is a two-person mode, and
    i. wherein the control signaling controls the first camera of the image shooting apparatus to rotate to face a driver position and perform video capture on the driver position, and
    ii. Wherein the control signaling controls the second camera of the image shooting apparatus to rotate to face a front passenger position and perform video capture on the front passenger position.

11. The method according to claim 1, wherein the at least two cameras include a third camera that remains in a pop-up state after the vehicle is started, and performs video capture on the space outside the vehicle after the privacy mode is entered.

12. A control apparatus configured to control an image shooting apparatus comprising at least two cameras, the control apparatus comprising:
    an obtaining circuit configured to obtain an instruction,
        wherein the instruction indicates one of several modes for operating the at least two cameras selected by a user of the image shooting apparatus,
        wherein the several modes include a panoramic photographing mode inside the cockpit of the vehicle, a panoramic photographing mode outside the vehicle, a driver photographing mode, a front passenger photographing mode, a privacy mode a video call mode, or a dual-camera video mode,
        wherein the control apparatus is configured to implement each of the several modes according to the instruction, and
        wherein the instruction is based on information provided by the user and instructs the control apparatus to enable the privacy mode;
    a processing circuit configured to generate control signaling for enabling the privacy mode;
    a control circuit configured to control a space state of at least one camera of the at least two cameras comprising the image shooting apparatus in based on the privacy mode indicated by the instruction,
        wherein the control signaling controls the image shooting apparatus to power off and retract the at least two cameras in response to the instruction indicating the privacy mode; and
    a visual or audible interface for communicating a visual or audible confirmation to the user that the privacy mode is enabled.

13. The control apparatus according to claim 12, wherein the space state comprises an angle, a position, or the angle and the position.

14. The control apparatus according to claim 12, wherein the panoramic photographing mode in the cockpit of the vehicle controls a first camera of the at least two cameras to rotate within a first preset angle range and perform panoramic scanning on space inside the cockpit.

15. The control apparatus according to claim 12, wherein the panoramic photographing mode outside the vehicle controls a first camera of the at least two cameras to rotate within a second preset angle range and perform panoramic scanning on space outside the vehicle.

16. The control apparatus according to claim 12, wherein the driver photographing mode controls a first camera of the at least two cameras to rotate to face a driver position of the vehicle and perform a photographing action on the driver position.

17. The control apparatus according to claim 12, wherein the front passenger photographing mode controls a first camera of the at least two cameras to rotate to face a front passenger position of the vehicle and perform a photographing action on the front passenger position.

18. The control apparatus according to claim 15, wherein the processing circuit is further configured to:

determine a position of a video call object based on the video call mode indicated by the instruction, a seat state in the cockpit, sound information in the cockpit, and image information in the cockpit; and generate the control signaling based on the position of the video call object, wherein the control signaling is used to control a first camera of the at least two cameras to rotate to face the position of the video call object.

19. The control apparatus according to claim 12, wherein the at least two cameras include a third camera that remains in a pop-up state after the vehicle is started, and performs video capture on the space outside the vehicle after the privacy mode is entered.

20. The control apparatus according to claim 12, wherein the instruction comprises any one of: a voice instruction, an instruction obtained by processing the voice instruction, an instruction input on a user interface, an instruction obtained by processing the instruction input on the user interface, or a received signal.

\* \* \* \* \*